US012722239B2

(12) United States Patent
Takeuchi et al.

(10) Patent No.: US 12,722,239 B2
(45) Date of Patent: Sep. 1, 2026

(54) DUST COLLECTING ATTACHMENT AND ELECTRIC POWER TOOL

(71) Applicant: MAKITA CORPORATION, Anjo (JP)

(72) Inventors: Hajime Takeuchi, Anjo (JP); Hitoshi Iida, Anjo (JP); Masanori Furusawa, Anjo (JP); Yoji Inoue, Anjo (JP)

(73) Assignee: MAKITA CORPORATION, Anjo (JP)

( * ) Notice: Subject to any disclaimer, the term of this patent is extended or adjusted under 35 U.S.C. 154(b) by 519 days.

(21) Appl. No.: 18/224,368

(22) Filed: Jul. 20, 2023

(65) Prior Publication Data

US 2024/0033870 A1 Feb. 1, 2024

(30) Foreign Application Priority Data

Jul. 27, 2022 (JP) ................................ 2022-119781
Jul. 27, 2022 (JP) ................................ 2022-119782

(51) Int. Cl.

*B23Q 11/00* (2006.01)
*B23B 45/00* (2006.01)
*B23B 45/02* (2006.01)

(52) U.S. Cl.

CPC ........ *B23Q 11/0046* (2013.01); *B23B 45/003* (2013.01); *B23B 45/02* (2013.01); *B23Q 11/0071* (2013.01)

(58) Field of Classification Search

CPC ............ B23Q 11/0046; B23Q 11/0071; B23B 45/003

See application file for complete search history.

(56) References Cited

U.S. PATENT DOCUMENTS 993,985 A * 5/1911 Harker .................... A47L 5/365 417/369
2,245,760 A * 6/1941 Clements .................. A47L 5/22 280/28.18

(Continued)

FOREIGN PATENT DOCUMENTS

CN 103009356 A 4/2013
JP S41-017811 Y 8/1966

(Continued)

OTHER PUBLICATIONS

Arielle Hein, 3D Printing Joints, Published Oct. 18, 2016, available at https://coloringchaos.github.io/form-fall-16/joints (Year: 2016).*

(Continued)

*Primary Examiner* — Kyle A Cook
(74) *Attorney, Agent, or Firm* — Oliff PLC

(57) ABSTRACT

A dust collecting attachment for an electric power tool includes dust collecting fans, a suctioning portion, and a dust collecting portion. The suctioning portion generates a suctioning force by rotation of the dust collecting fans. The dust collecting portion captures dust suctioned from the suctioning portion. When the dust collecting attachment is mounted to an electric power tool including a motor, a fan shaft of the dust collecting fans is connected to a rotation shaft that is disposed in the electric power tool and rotates in accordance with driving of the motor to allow the dust collecting fans to rotate integrally with the rotation shaft. The dust collecting fans are disposed in a plurality of stages in an axial direction of the fan shaft.

16 Claims, 17 Drawing Sheets

(56) References Cited

U.S. PATENT DOCUMENTS

| | | | | | |
|---|---|---|---|---|---|
| 2,454,570 | A * | 11/1948 | Rector | A47L 9/22 417/363 |
| 3,791,772 | A * | 2/1974 | Keimpema | F04D 17/164 417/423.2 |
| 3,874,023 | A * | 4/1975 | Tschudy | A47L 5/22 181/207 |
| 5,199,501 | A * | 4/1993 | Kluber | B23Q 11/0046 173/171 |
| 6,851,898 | B2 | 2/2005 | Ege et al. | |
| 2002/0141836 | A1 | 10/2002 | Ege et al. | |
| 2005/0188498 | A1 * | 9/2005 | Thanner | F16C 35/077 15/344 |
| 2017/0057037 | A1 * | 3/2017 | Lauer | B25D 17/20 |
| 2019/0358758 | A1 | 11/2019 | Ullrich | |

FOREIGN PATENT DOCUMENTS

| | | | |
|---|---|---|---|
| JP | S61-082728 | A | 4/1986 |
| JP | 04-226850 | A | 8/1992 |
| JP | 2002-331437 | A | 11/2002 |
| JP | 4071978 | B2 | 4/2008 |
| JP | 2010-201516 | A | 9/2010 |
| JP | 2017-509501 | A | 4/2017 |
| JP | 2019-181605 | A | 10/2019 |
| JP | 6720528 | B2 | 7/2020 |
| JP | 2022-056415 | A | 4/2022 |
| JP | 2022-185909 | A | 12/2022 |
| JP | 2023-000836 | A | 1/2023 |

OTHER PUBLICATIONS

Feb. 3, 2026 Office Action issued in Chinese Patent Application No. 2022-119781.

Nov. 27, 2025 Office Action issued in Japanese Patent Application No. 2022-119782.

* cited by examiner

S
1
5
16
18
15
14
4
64
6
21
143
161
160
143
11
86
97
87
61
61a
3
51
63
62
65
85
60
B
176
177
UP
RIGHT
REAR
DOWN
FRONT
LEFT 63 60 61 66 61b 62 70(67) 160 72 135 71 124(115) 65 86 161 162 87 125 166 133 130 61a 91 143 85 103 160 97 143 161 143 134 64

UP
DOWN
FRONT
REAR
RIGHT
LEFT
67
70
68
74
75
77
76
78
69
102
102
161
64
143
143
160
61a(61)
71
62
83
83
66
84
84
82
81
81
83
84
83
84
63
80
99
89
101
98
100
88
92
103
91
85
86
92
96
97
87

63
66
61a(61)
62
71
82
73
81
160
143
161
157
64
158
110
69
102
76
77
78
67
68
75
74
70
85
88
98
99
100
89
101
86
90
93
94
95
92
91
103
87
96
UP
DOWN
FRONT
REAR
LEFT
RIGHT

60
UP
DOWN
REAR
FRONT
82
74
73
102
98
105
78
62
68
69
67
71
70
72
107(106)

60
UP
DOWN
REAR
FRONT
82
98
74
73
102
105
78
62
68
69
71
67
70
72
107(106)

60
UP
DOWN
REAR
FRONT
98
184
182
185
73
74
102
82
183
105
78
62
68
69
67
71
70
72
107(106)

60
UP
DOWN
REAR
FRONT
98
184
182
185
73
74
102
82
183
105
78
62
68
69
67
71
70
72
107(106)

DUST COLLECTING ATTACHMENT AND ELECTRIC POWER TOOL

CROSS REFERENCE TO RELATED APPLICATION

This application claims the benefit of Japanese Patent Application Numbers 2022-119871 and 2022-119782 filed on Jul. 27, 2022, the entirety of which is incorporated by reference.

FIELD OF THE INVENTION

The disclosure relates to a dust collecting attachment mounted to an electric power tool for collecting dust generated during using the electric power tool and the electric power tool to which the dust collecting attachment is mounted.

BACKGROUND OF THE INVENTION

When workpieces such as concrete and stone materials are processed using an electric power tool such as a hammer drill, a dust collecting attachment is mounted to an electric power tool such that dust generated from the workpieces do not scatter.

As the dust collecting attachment, for example, JP 4071978 B discloses a structure where a suction head through which a tool bit passes is disposed to a casing mounted to an electric power tool. In the casing, a dust collecting portion that has a filter and a dust collecting fan that is connected to a rotation shaft of the electric power tool in a mounted state are disposed. When the electric power tool is driven, the dust collecting fan rotates together with a motor to generate a suctioning force at the suction head, and dust suctioned together with external air can be captured in the dust collecting portion.

SUMMARY OF THE INVENTION

In a dust collecting attachment that obtains power for a dust collecting fan from a motor of an electric power tool as described above, a suctioning force by rotation of the dust collecting fan depends on a rotation speed of the motor. However, when the electric power tool is one where the rotation speed of the motor is low like a large-sized hammer drill, a necessary suctioning force cannot be obtained in some cases. While the suctioning force can be increased by increasing a size, which is typically an outside diameter, of the dust collecting fan, an increase in size of the attachment itself is brought.

Therefore, it is an object of the disclosure to provide a dust collecting attachment and an electric power tool where even when power is obtained from a motor of an electric power tool, a necessary suctioning force can be obtained without enlarging a size.

In order to achieve the above-described object, a first configuration of the disclosure is a dust collecting attachment. The dust collecting attachment includes dust collecting fans, a suctioning portion, and a dust collecting portion. The suctioning portion generates a suctioning force by rotation of the dust collecting fans. The dust collecting portion captures dust suctioned from the suctioning portion. When the dust collecting attachment is mounted to an electric power tool including a motor, a fan shaft of the dust collecting fans is connected to a rotation shaft that is disposed in the electric power tool and rotates in accordance with driving of the motor to allow the dust collecting fans to rotate integrally with the rotation shaft.

The dust collecting fans are disposed in a plurality of stages in an axial direction of the fan shaft.

In order to achieve the above-described object, a second configuration of the disclosure is an electric power tool. The electric power tool includes the dust collecting attachment of the first configuration.

According to the disclosure, a large suctioning force can be secured by a plurality of stages of dust collecting fans, which eliminates the need for increasing the size of the dust collecting fan. Accordingly, even when the power is obtained from the motor of the electric power tool, the necessary suctioning force can be obtained without increasing the size.

BRIEF DESCRIPTION OF THE DRAWINGS

FIG. 10A illustrates a stopper at a locking position, and FIG. 10B illustrates a stopper at a locking release position.

FIG. 17A illustrates a stopper at a locking position, and FIG. 17B illustrates a stopper at a locking release position.

DETAILED DESCRIPTION OF THE INVENTION

Figure 1:
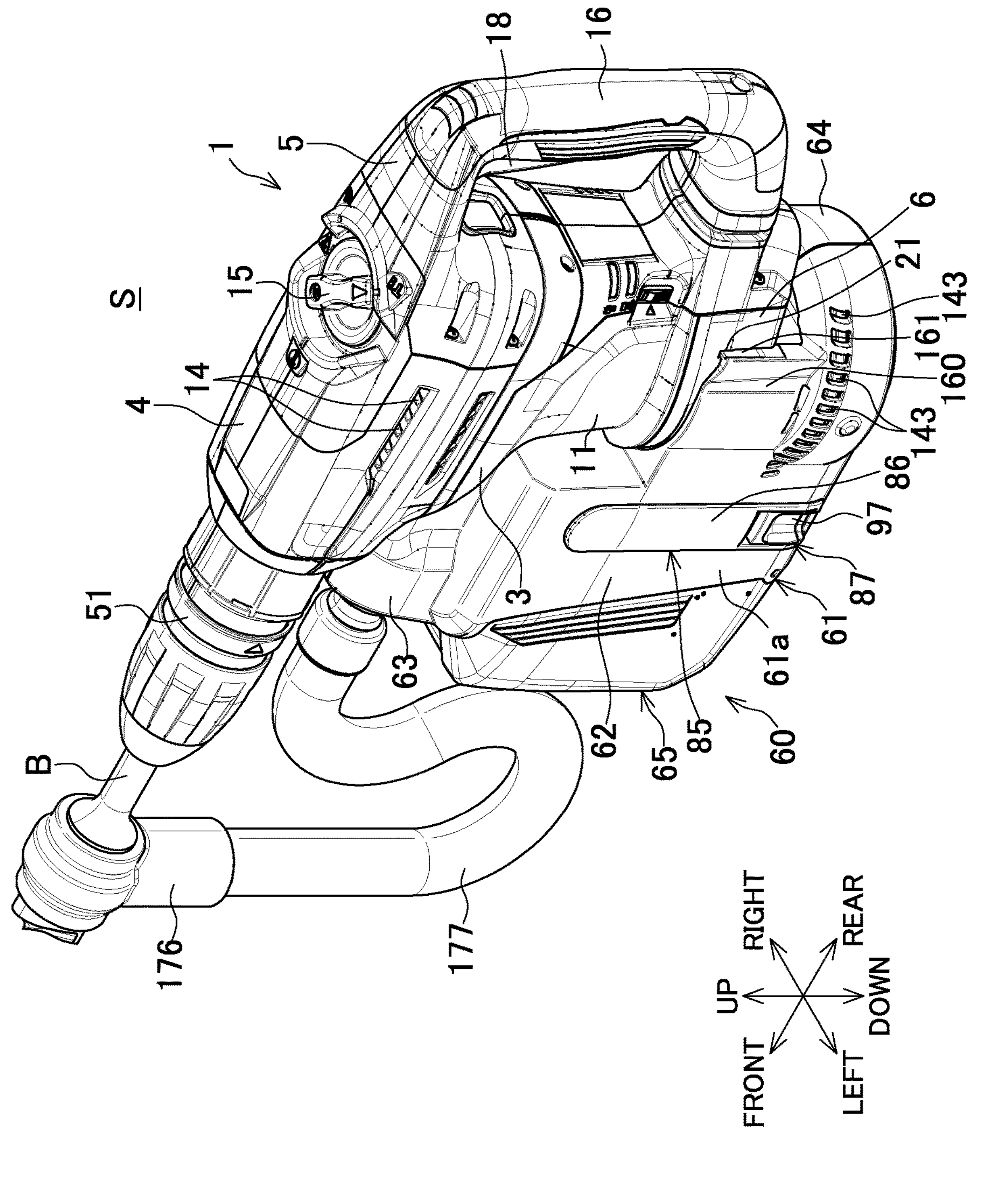
FIG. 1 is a perspective view of a dust collection system for an electric power tool from rear.

In one embodiment of the disclosure, a first flow regulating member that guides air from an outer peripheral side of a dust collecting fan of a first stage to a center side of a dust collecting fan of a second stage may be disposed between the dust collecting fans that are adjacent with one another in an axial direction. Each dust collecting fan is a centrifugal fan.

According to the configuration, even when a plurality of stages of dust collecting fans, which are centrifugal fans, are disposed, an airflow from the dust collecting fan of the first stage to the dust collecting fan of the second stage can be maintained.

In one embodiment of the disclosure, a second flow regulating member that partitions between a downstream side surface of the dust collecting fan of the first stage and the airflow by the first flow regulating member may be disposed between the dust collecting fan of the first stage and the first flow regulating member.

According to the configuration, contact between the rotating dust collecting fan of the first stage and the air flowing radially inward is suppressed, and turbulence is less likely to occur.

In one embodiment of the disclosure, a whirl-shaped rib may be disposed upright on a surface of the second flow regulating member on a side of the first flow regulating member.

According to the configuration, it is possible to generate a swirl flow in the air to guide it smoothly radially inward.

In one embodiment of the disclosure, the first flow regulating member and the second flow regulating member may be secured with one another.

According to the configuration, assembling and positioning of both the flow regulating members can be easily performed.

In one embodiment of the disclosure, a fan shaft separately includes a connecting shaft connected to a rotation shaft. The connecting shaft may be connected to the fan shaft in a state where it is movable in an axial direction and is biased to a connecting side with the rotation shaft via an elastic member.

According to the configuration, when the dust collecting attachment is mounted to an electric power tool, an impact when the connecting shaft is connected to the rotation shaft can be reduced.

In one embodiment of the disclosure, the fan shaft and the connecting shaft may be relatively rotatable only by a predetermined angle around the shaft.

According to the configuration, an impact in a rotation direction when the rotation shaft is activated and the connecting shaft integrally rotates can be reduced.

In one embodiment of the disclosure, the respective dust collecting fans may have an identical shape.

According to the configuration, even when a plurality of stages of the dust collecting fans are used, cost increase can be suppressed, and also assembly errors do not occur.

In one embodiment of the disclosure, the dust collecting fans may be disposed in two stages in the axial direction.

According to the configuration, a necessary suctioning force can be obtained with minimum configuration.

In one embodiment of the disclosure, an engaging portion that engages with the electric power tool to center the fan shaft with respect to the rotation shaft when the fan shaft is connected to the rotation shaft may be disposed.

According to the configuration, the fan shaft can be smoothly connected to the rotation shaft when the dust collecting attachment is mounted to the electric power tool.

In one embodiment of the disclosure, the engaging portion is disposed in a bearing holding member that holds a bearing supporting the fan shaft, and the fan shaft and the bearing holding member are positioned to one another via the bearing.

According to the configuration, the fan shaft and the engaging portion are coaxially positioned with one another, and centering by the engaging portion can be accurately performed.

The following describes embodiments of the disclosure based on the drawings.

Figure 2:
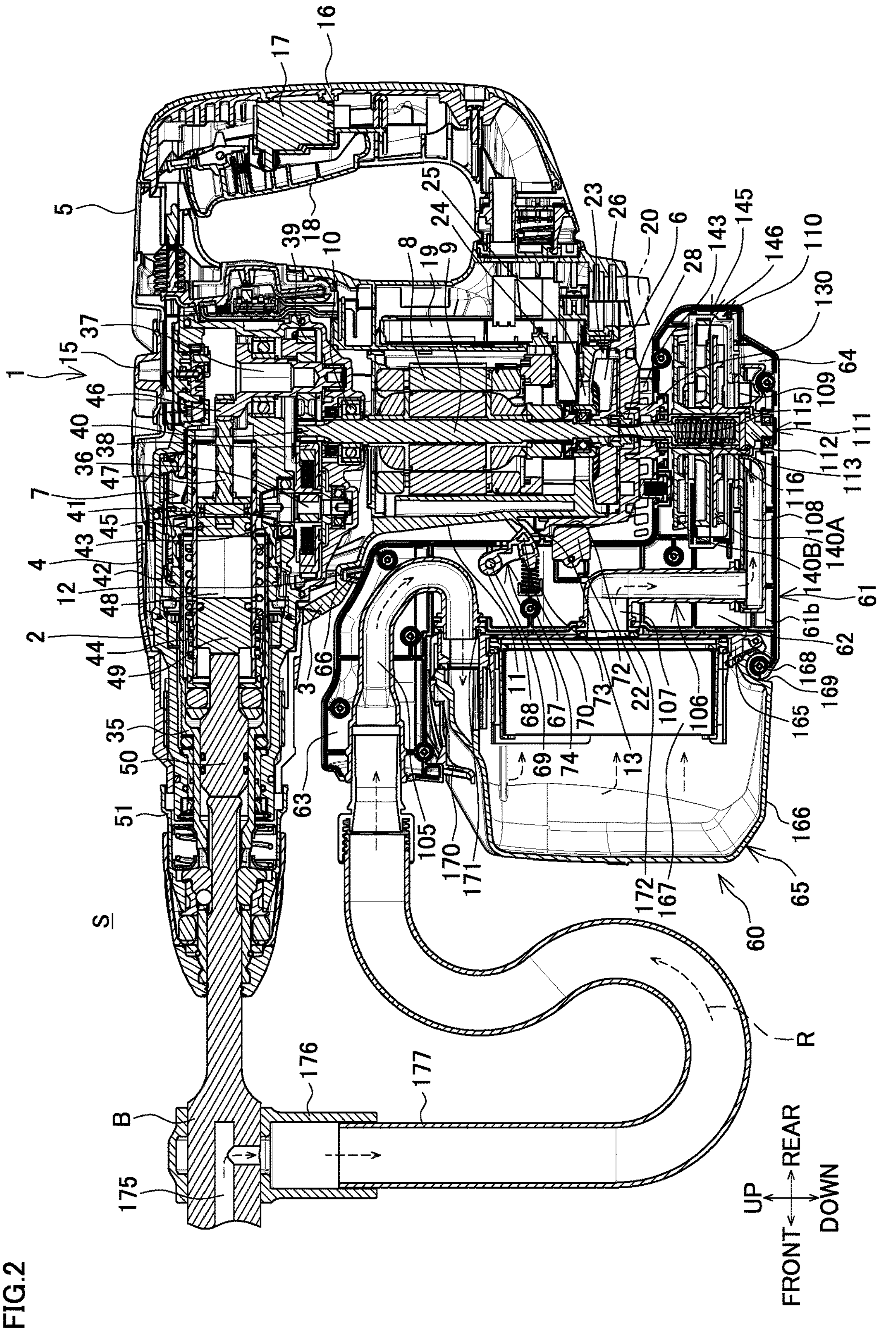
FIG. 2 is a center vertical cross-sectional view of the dust collection system for the electric power tool.
Figure 3:
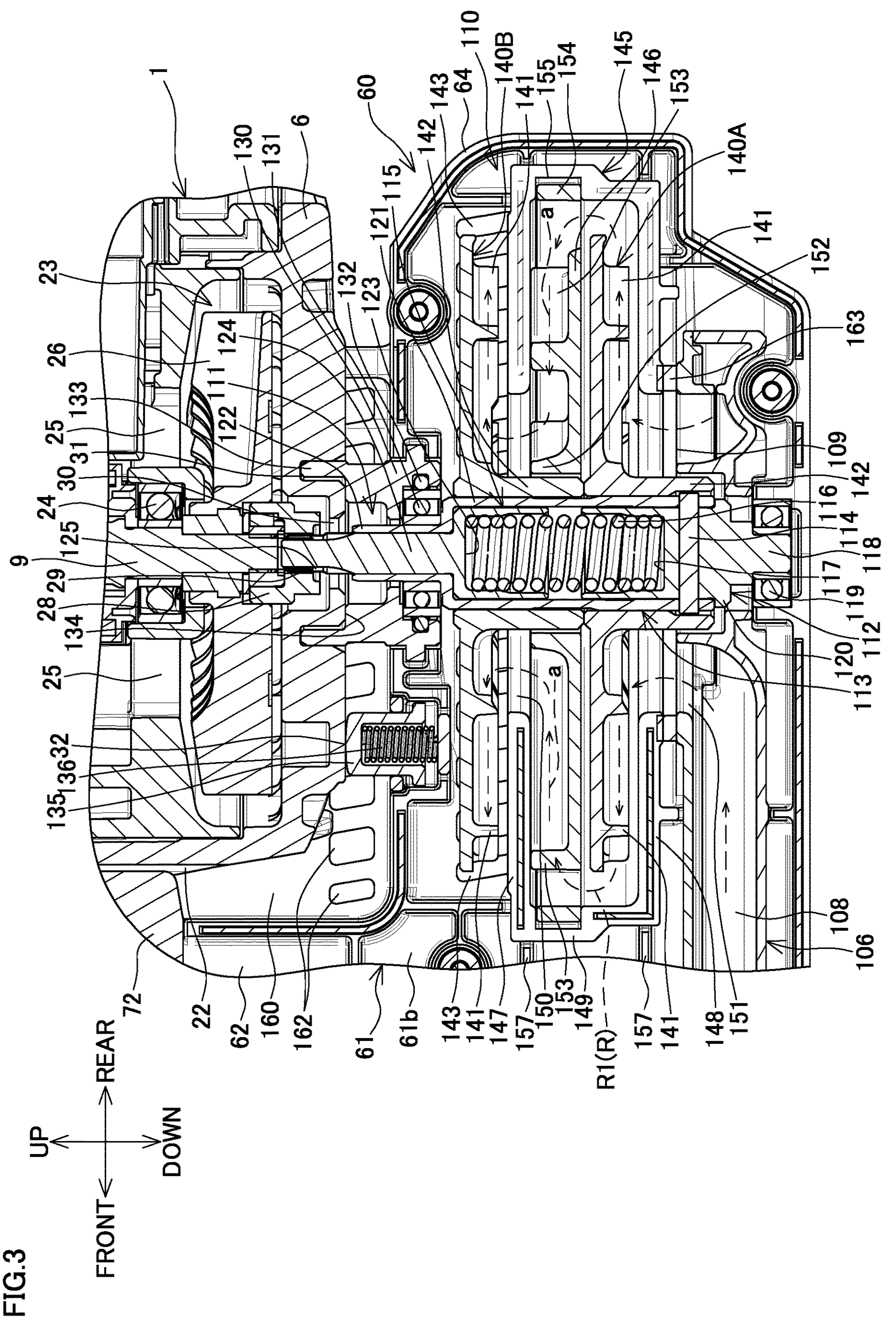
FIG. 3 is an enlarged view of a joining portion between a rotation shaft and a fan shaft in FIG. 2.

FIG. 1 is a perspective view illustrating one example where a dust collection system for an electric power tool (hereinafter simply referred to as a "dust collection system") S is formed by mounting a dust collecting attachment 60 to a hammer drill 1, which is one example of the electric power tool. FIG. 2 is a center vertical cross-sectional view of the dust collection system S. FIG. 3 is an enlarged view of a joining portion between the rotation shaft and the fan shaft in FIG. 2.

The hammer drill is described.

The hammer drill 1 has an inner housing 2, a motor housing 3, an outer housing 4, a handle housing 5, and a lower housing 6, as a housing. The inner housing 2 houses a hammering mechanism portion 7. The motor housing 3 is connected to the outer housing 4 on a lower side of the inner housing 2 and houses a motor 8. The motor 8 is held inside the motor housing 3 with a rotation shaft 9 facing upward. An upper end portion of the rotation shaft 9 is supported by a bearing 10 held in the inner housing 2 and protrudes into the inner housing 2.

Figure 4:
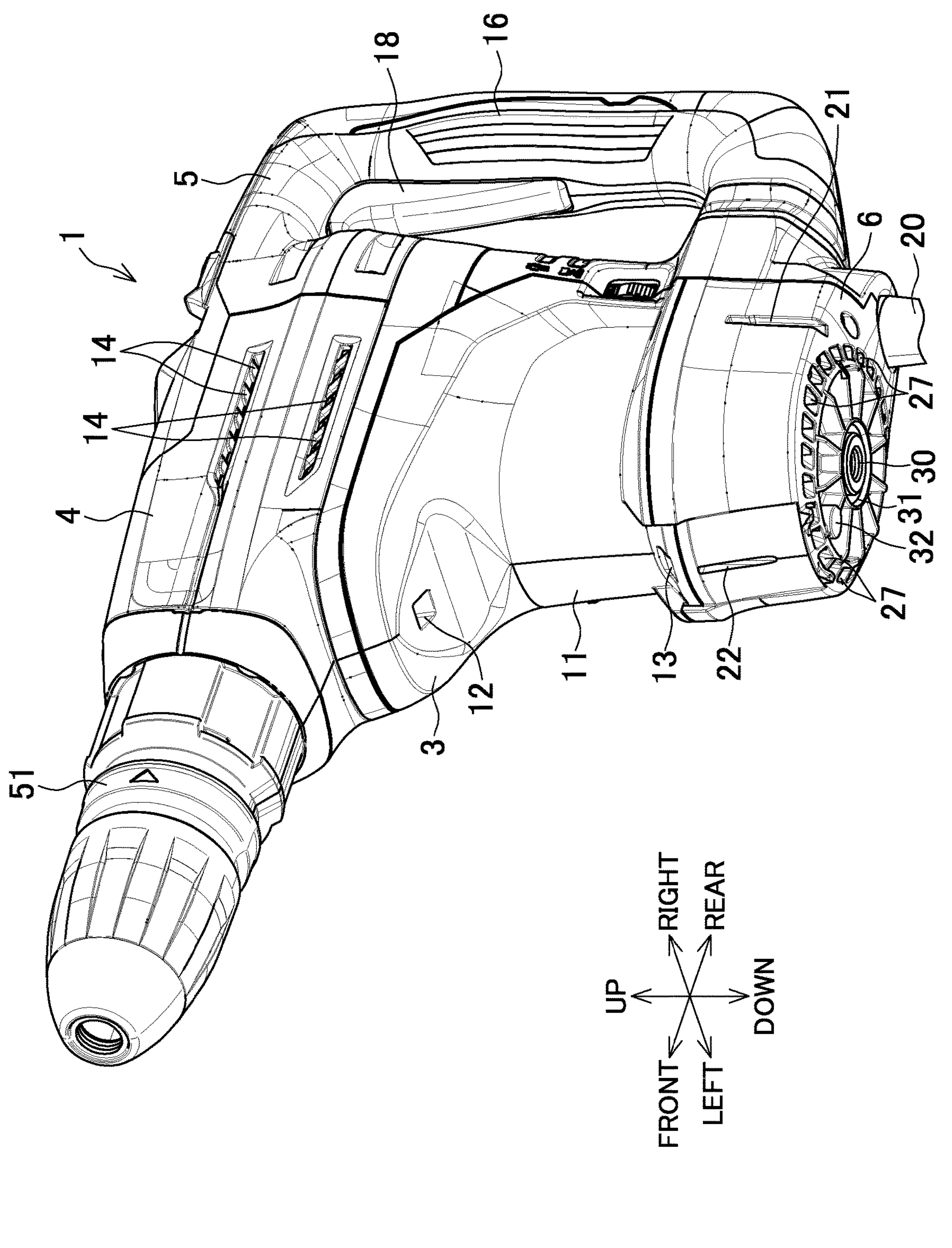
FIG. 4 is a perspective view of a hammer drill from front.

As also indicated in FIG. 4, on a peripheral surface of the motor housing 3, a narrowed portion 11 having an outer diameter smaller than those of upper and lower portions is disposed. An engaging depressed portion 12 is formed on an inclined surface on an upper side of the narrowed portion 11 on a front surface of the motor housing 3. The engaging depressed portion 12 is a closed-end hole opening downward at the center in a right-left direction. A receiving surface portion 13 is formed on an inclined surface on a lower side of the narrowed portion 11 on the front surface of the motor housing 3. The receiving surface portion 13 is a depressed portion that is slightly depressed at the center in the right-left direction.

The outer housing 4 covers an outside of the inner housing 2 on an upper side of the motor housing 3. A plurality of power-tool-side intake ports 14, 14 . . . are formed on right and left side surfaces of the outer housing 4. A switching knob 15 is disposed on an upper surface of the outer housing 4.

The handle housing 5 is disposed from a rear side of the outer housing 4 up to a rear side of the motor housing 3.

The handle housing 5 includes a handle portion 16. The handle portion 16 extends in the up-down direction on the rear side of the outer housing 4 and the motor housing 3. A switch 17 is disposed inside the handle portion 16. The switch 17 has a switch lever 18 protruding forward.

Between the motor housing 3 and the handle housing 5, a controller 19 having a control circuit board is housed in the up-down direction. A power supply cord 20 is connected to the handle housing 5 below the controller 19.

The lower housing 6 is screwed to the motor housing 3 in a manner of covering a lower surface and a peripheral surface of a lower portion of the motor housing 3 from a lower side. On right and left side surfaces of the lower housing 6, a pair of engaging grooves 21, 21 are formed upward from a lower surface of the lower housing 6. At the center in the right-left direction on a front surface of the lower housing 6, a receiving groove 22, which is cut upward, is formed.

Between a lower surface of the motor housing 3 and the lower housing 6, a power-tool-side fan housing chamber 23 is formed. A lower end of the rotation shaft 9 is supported by a bearing 24 disposed in the motor housing 3 and projects into the power-tool-side fan housing chamber 23. A plurality of ventilation ports 25, 25 . . . are formed in the motor housing 3 in a peripheral area of the bearing 24. A power-tool-side fan 26 as a centrifugal fan is orthogonally mounted at the lower end of the rotation shaft 9 inside the power-tool-side fan housing chamber 23. A plurality of power-tool-side exhaust ports 27, 27 . . . are concentrically formed on the lower surface of the lower housing 6 on an outer periphery of the power-tool-side fan 26.

A connecting sleeve 28 is coaxially secured at the lower end of the rotation shaft 9 that projects from the power-tool-side fan 26. An inner spline 29 is formed on an inner periphery of the connecting sleeve 28. A through hole 30 is formed on the lower surface of the lower housing 6. The through hole 30 is coaxially positioned immediately below the rotation shaft 9 and the connecting sleeve 28 and causes the inner spline 29 to be exposed downward. A ring groove 31 that is concentric with the through hole 30 is formed on the lower surface of the lower housing 6 in a peripheral area of the through hole 30. A receiving portion 32 having a circular shape in a bottom view is formed on the lower surface of the lower housing 6 on a front side of the ring groove 31.

The hammering mechanism portion 7 has a tool holder 35. The tool holder 35 has a cylindrical shape and is held on a front side of the inner housing 2 to extend in the front-rear direction. Inside the inner housing 2, an intermediate shaft 36 is supported in the up-down direction on a front side of the rotation shaft 9, and a crankshaft 37 is supported in the up-down direction on a rear side of the rotation shaft 9. The intermediate shaft 36 and the crankshaft 37 are provided with a gear 38 and a gear 39, respectively. The gear 38 and the gear 39 mesh with a pinion 40 disposed at an upper end of the rotation shaft 9. The intermediate shaft 36 has a first bevel gear 41 at its upper end.

A switching sleeve 42 is spline-connected to the tool holder 35. A second bevel gear 43 is externally mounted in a rotatable manner at a rear end of the tool holder 35 on a rear side of the switching sleeve 42. The second bevel gear 43 meshes with the first bevel gear 41. By engaging the switching sleeve 42 at a retreated position, the second bevel gear 43 transmits a rotation of the first bevel gear 41 to the tool holder 35. A front-rear position of the switching sleeve 42 can be switched by the switching knob 15.

A cylinder 44 is held inside a rear portion of the inner housing 2. The cylinder 44 is coaxially inserted into a rear portion of the tool holder 35. A piston 45 is housed in the cylinder 44 so as to be movable back and forth. An eccentric pin 46 is disposed to protrude on an upper portion of the crankshaft 37. The piston 45 is connect to the eccentric pin 46 by a connecting rod 47. A striker 49 is housed so as to be movable back and forth via an air chamber 48 on a front side of the piston 45 inside the cylinder 44. An impact bolt 50 is disposed inside the tool holder 35 on a front side of the striker 49. A bit B inserted into a front end of the tool holder 35 abuts on the impact bolt 50. An operation sleeve 51 for attaching and removing the bit B is externally mounted in a front portion of the tool holder 35.

In the hammer drill 1, when the switch lever 18 is pushed to turn on the switch 17, the motor 8 is driven to rotate the rotation shaft 9. Then, the crankshaft 37 is rotated to move the piston 45 back and forth via the connecting rod 47. Consequently, the striker 49 in conjunction with the piston 45 hammers the bit B via the impact bolt 50. Switching the switching sleeve 42 to the retreated position by operating the switching knob 15 leads to entering a hammer drill mode where rotation is transmitted from the intermediate shaft 36 to the tool holder 35 via the second bevel gear 43. Switching the switching sleeve 42 to an advance position leads to entering a hammer mode where the tool holder 35 does not rotate and only hammering is performed.

The dust collecting attachment is described.

Figure 5:
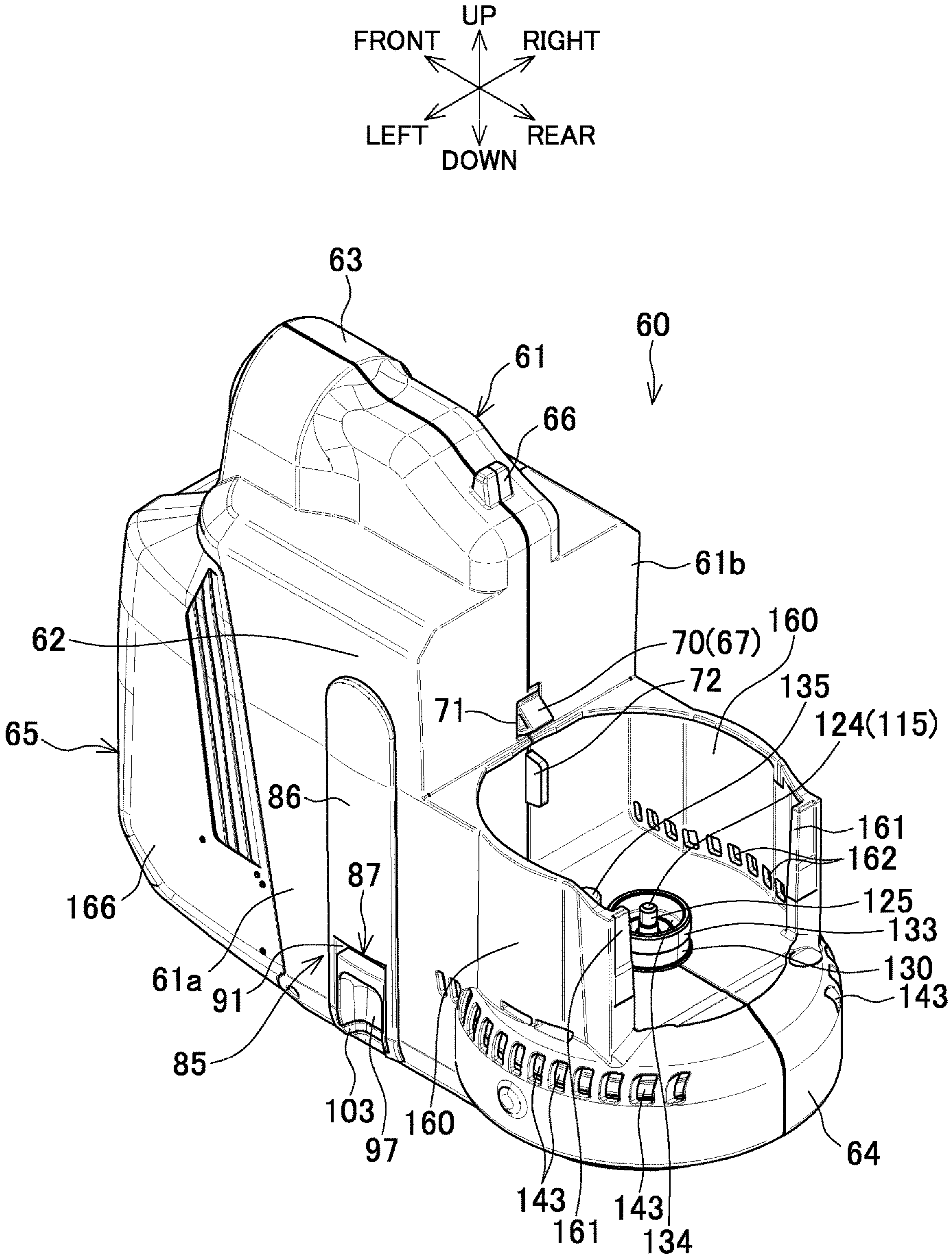
FIG. 5 is a perspective view of a dust collecting attachment from the rear.
Figure 6:
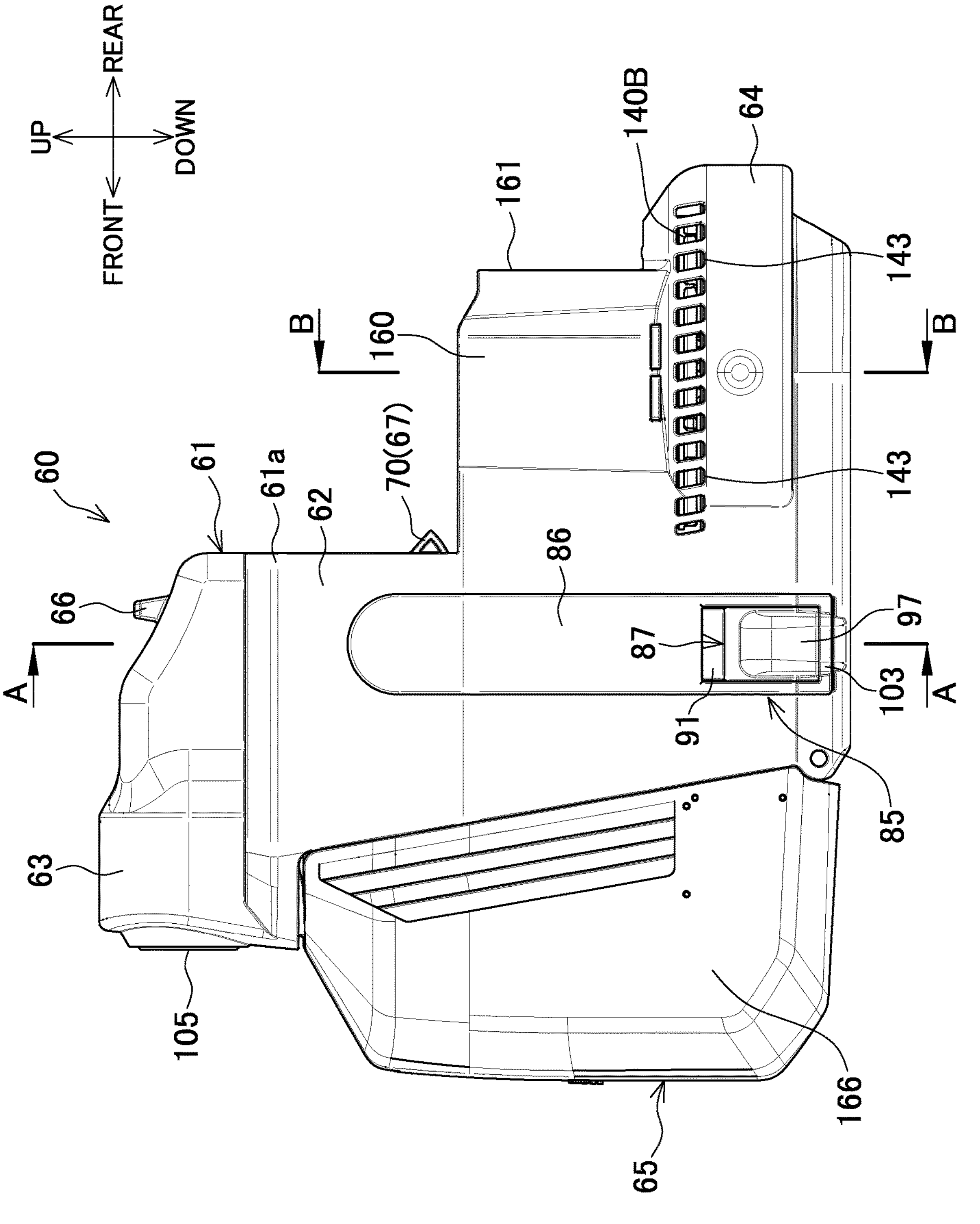
FIG. 6 is a side view of the dust collecting attachment.

As also indicated in FIG. 5 and FIG. 6, the dust collecting attachment 60 has a box-shaped casing 61. The casing 61 is formed by screwing a half casing 61*a* on the left side and a half casing 61*b* on the right side. The casing 61 includes a main body portion 62, a front projecting portion 63, and a rear projecting portion 64. The main body portion 62 extends in the up-down direction, and the front projecting portion 63 extends forward from an upper portion of the main body portion 62. A dust box 65 is attachable and removable on a front side of the main body portion 62 and on a lower side of the front projecting portion 63. The rear projecting portion 64 extends rearward from a lower portion of the main body portion 62. The main body portion 62 and the rear projecting portion 64 can be mounted to the hammer drill 1.

An engaging projecting portion 66 is formed upward at the center in the right-left direction on an upper surface of the main body portion 62. The engaging projecting portion 66 can be inserted into the engaging depressed portion 12 disposed in the motor housing 3 of the hammer drill 1.

Figure 7:
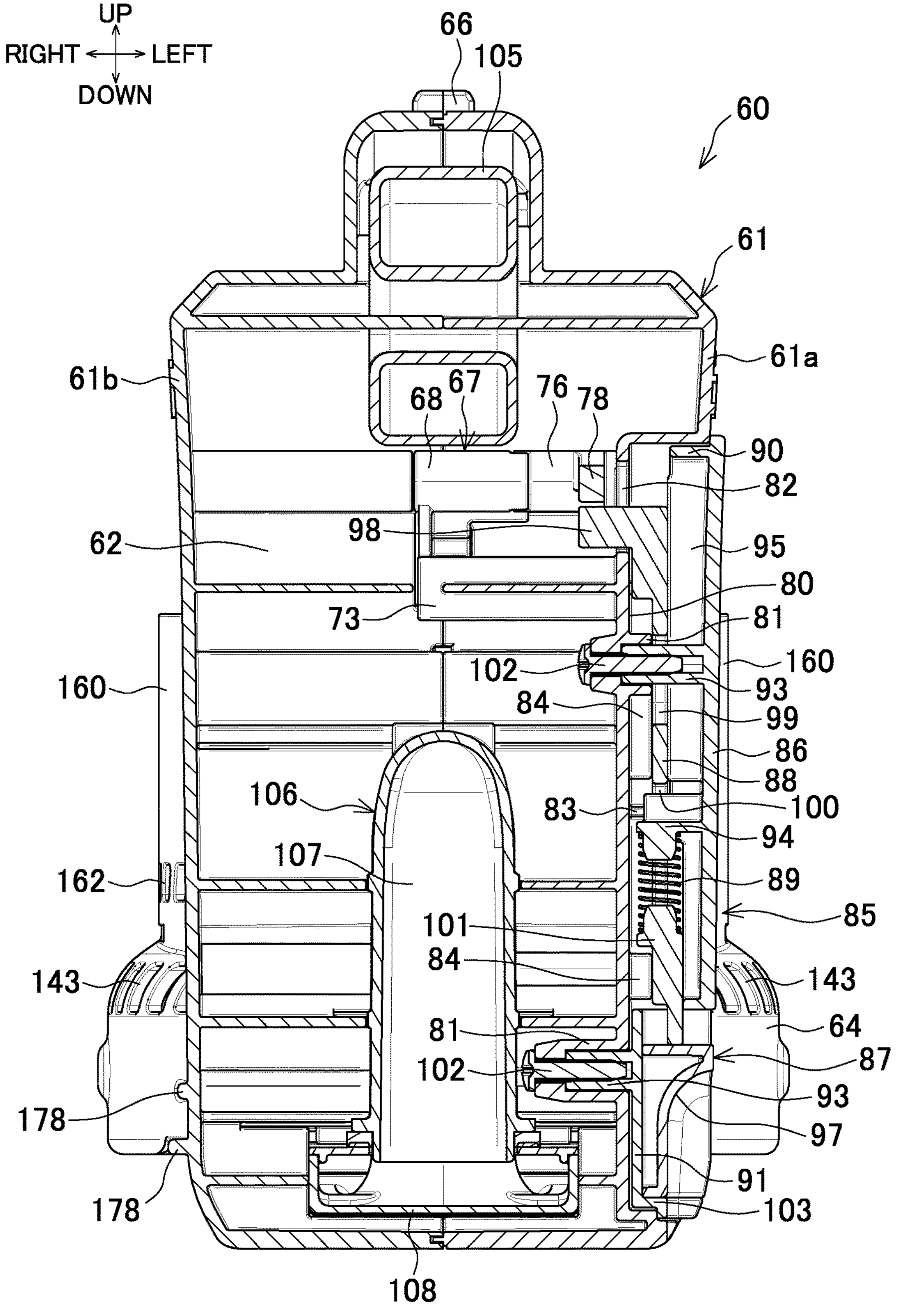
FIG. 7 is a cross-sectional view taken along the line A-A in FIG. 6.
Figure 8:
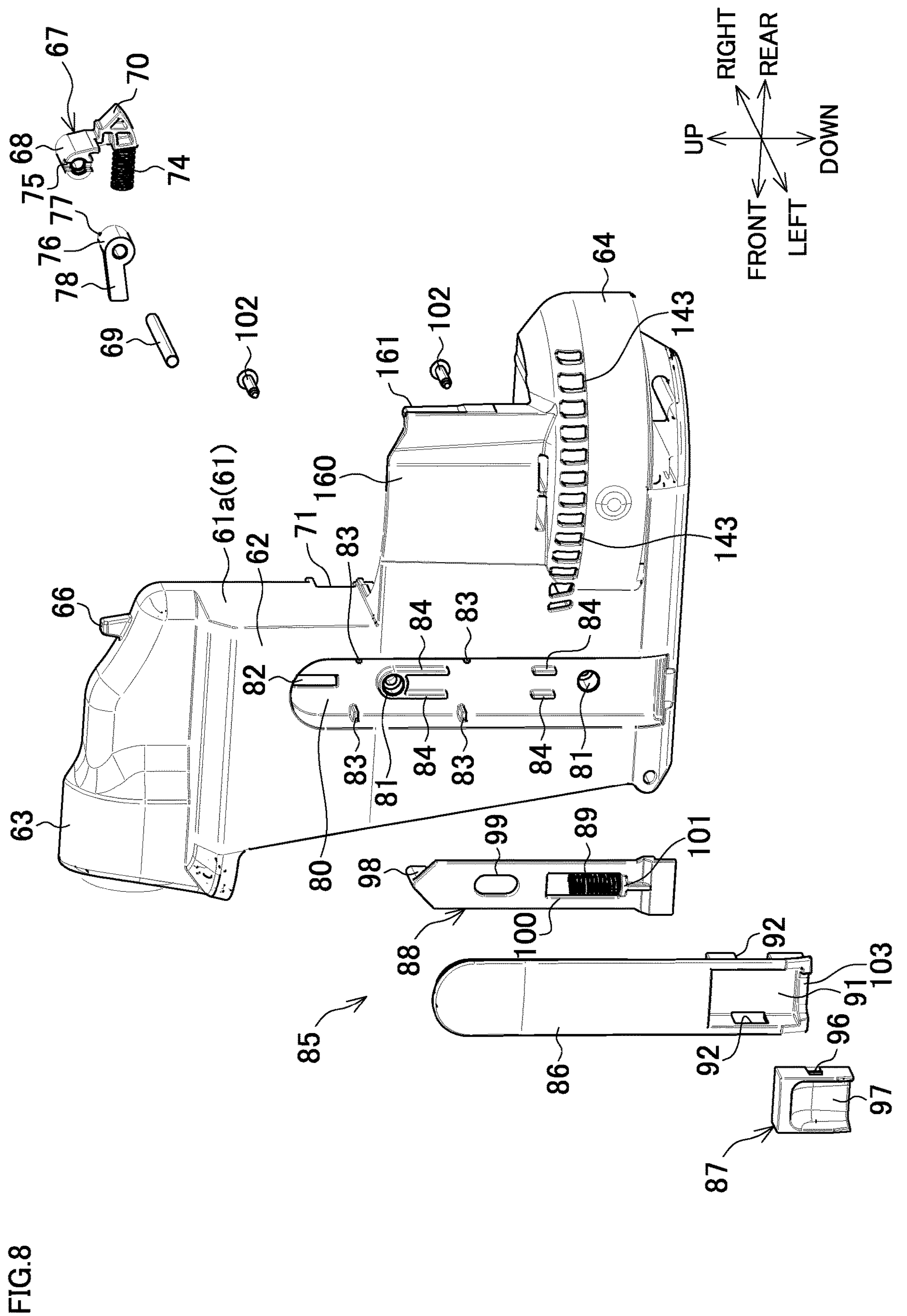
FIG. 8 is a perspective view illustrating an exploded operation portion from a left side.

A stopper 67 is disposed at the center in the right-left direction on a rear surface of the main body portion 62. As also indicated in FIG. 7 and FIG. 8, the stopper 67 includes a cylindrical portion 68 extending in the right-left direction at its upper end. The cylindrical portion 68 is penetrated by a shaft 69 that is held in the right-left direction inside the main body portion 62. Accordingly, the stopper 67 is supported so as to be swingable to the front and the rear around the shaft 69. A locking portion 70 having a triangular shape in a side view is formed at a lower rear portion of the stopper 67. A window 71 is formed on the rear surface of the main body portion 62 corresponding to the locking portion 70. A locking plate 72 is disposed on a lower side of the window 71. The locking plate 72 is a plate body parallel to a planar surface specified in the up-down and front-rear directions and projects rearward from the center in the right-left direction on the rear surface of the main body portion 62. The locking plate 72 can be locked to the receiving groove 22 disposed on the front surface of the lower housing 6 of the hammer drill 1.

The stopper 67 can swing back and forth between a locking position where the stopper 67 projects from the casing 61 and a locking release position where the stopper 67 retreats into the casing 61. At the locking position, an intermediate portion of the stopper 67 abuts on an upper end of the window 71 and causes the locking portion 70 at the lower end to project from the window 71. At the locking release position, the locking portion 70 retreats into the window 71. A receiving rib 73 extending on the right side on the front side with respect to the locking portion 70 is disposed on the half casing 61*a* on the left side. A coil spring 74 is interposed between the stopper 67 and the receiving rib 73 to bias the stopper 67 to the locking position.

Figure 9:
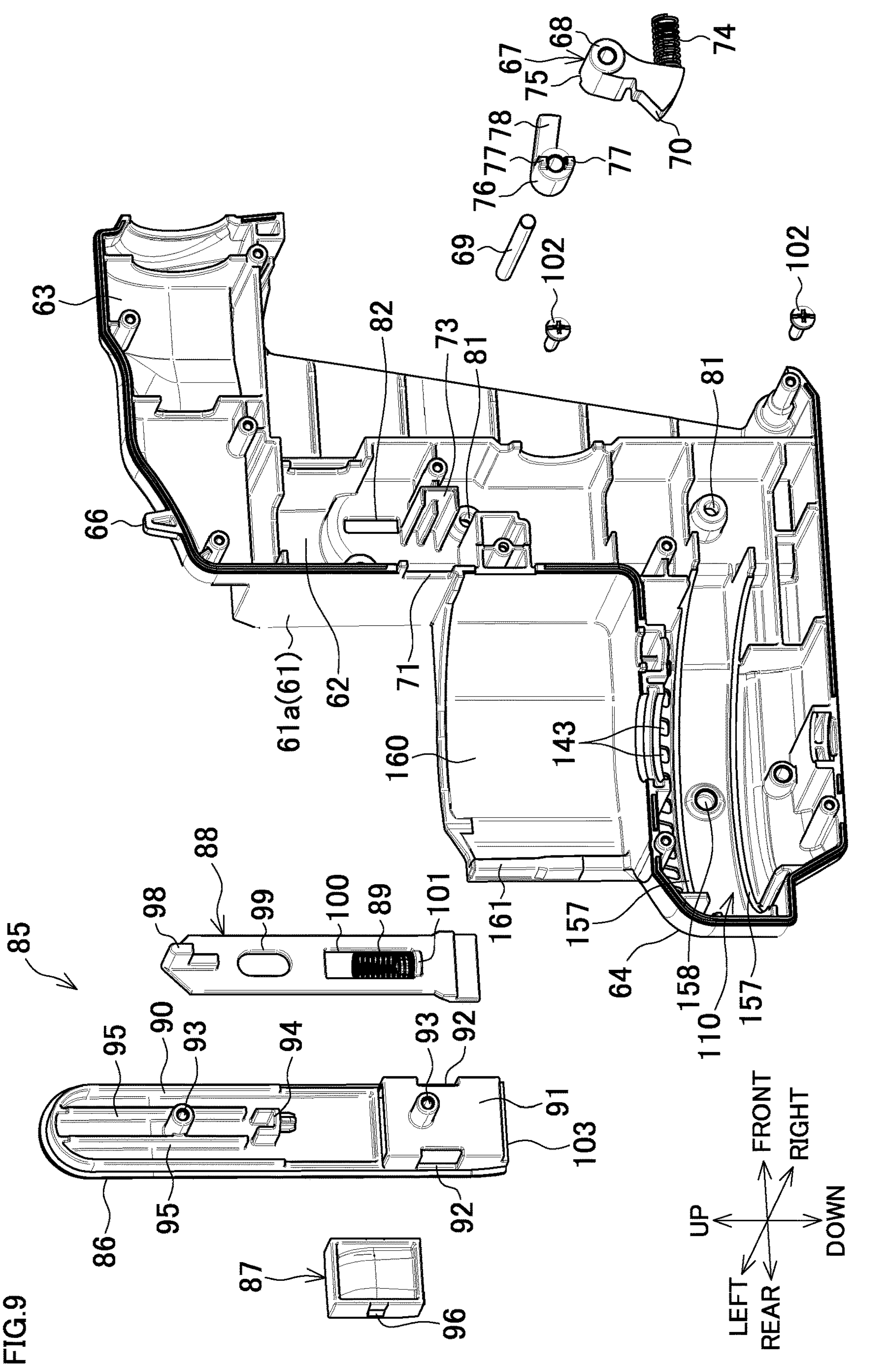
FIG. 9 is a perspective view illustrating the exploded operation portion from a right side.

A groove 75 is formed in a diameter direction on a left end surface of the cylindrical portion 68. A joining member 76 is disposed on a left side of the stopper 67. The joining member 76 is a cylindrical body penetrated and rotatably supported by the shaft 69. As indicated in FIG. 9, projections 77, 77 engaging with the groove 75 of the cylindrical portion 68 are disposed in the diameter direction on a right end surface of the joining member 76. Accordingly, the joining member 76 swing integrally with the stopper 67. A linking piece 78 projecting forward is disposed at a left end of the joining member 76.

As indicated in FIGS. 7 to 9, on a left side surface of the main body portion 62, a mounting recessed portion 80 extending upward from its lower surface is formed. Screw receiving cylinders 81, 81 penetrating in the right-left direction and projecting into the main body portion 62 are formed at two places on the upper and lower sides of the mounting recessed portion 80. A slit 82 extending in the up-down direction is formed therethrough above the upper-side screw receiving cylinder 81. A pair of lateral ribs 83, 83 arranged separately on both the front and rear sides are disposed to protrude in two pairs in the up-down direction on a bottom surface of the mounting recessed portion 80. Pairs of longitudinal ribs 84, 84 in the front and the rear between the lateral ribs 83, 83 are disposed to protrude in two pairs on the upper and lower sides on the bottom surface of the mounting recessed portion 80.

An operation portion 85 for moving the stopper 67 to the locking release position is disposed in the mounting recessed portion 80.

The operation portion 85 includes a holding cover 86, an operation button 87, a slide bar 88, and a coil spring 89.

The holding cover 86 has a band plate shape that is identical to that of the mounting recessed portion 80 and is slightly larger than that of the mounting recessed portion 80 in a side view and has a right surface where a framing portion 90 fitting to the mounting recessed portion 80 is formed. A lower portion of the holding cover 86 has a button receiving portion 91 having a longitudinally elongated rectangular shape in a side view connected to a lower side of the framing portion 90 and depressed to a right side. The button receiving portion 91 opens in the up-down direction. A pair of cutout portions 92, 92 having a rectangular shape in a front view are formed in the front and rear of the button receiving portion 91.

Screw bosses 93, 93 fitting to the screw receiving cylinders 81, 81 are formed in two places on upper and lower sides on a right surface of the holding cover 86 opposed to the mounting recessed portion 80. An upper spring receiver 94 with a boss projecting downward is disposed to protrude on a lower side of the screw boss 93 on an upper side. The screw boss 93 on the lower side is disposed to protrude from a right surface of the button receiving portion 91. A pair of longitudinal ribs 95, 95, lower ends of which are positioned on an upper side of the upper spring receiver 94, are formed on the front and the rear of the screw boss 93 on the upper side in the framing portion 90.

The operation button 87 is housed in the button receiving portion 91 of the holding cover 86. The operation button 87 has a rectangular shape in a side view, and its front-rear width is formed in a size fitting to the button receiving portion 91, and its up-down width is formed in a size smaller than the button receiving portion 91. A pair of locking projections 96, 96 are formed on the front and rear surfaces of the operation button 87. The locking projections 96, 96 are engaged with the left-side side edges of the cutout portions 92, 92 in a state where the operation button 87 is housed in the button receiving portion 91. Accordingly, the operation button 87 can move in the up-down direction in the button receiving portion 91 in a state of being retained to the left side. A finger abutment portion 97 that projects to the left side as it advances upward with its lower surface opened is formed on the left surface of the operation button 87.

The slide bar 88 is positioned between the longitudinal ribs 84, 84 of the mounting recessed portion 80 and the longitudinal ribs 95, 95 of the holding cover 86. The slide bar 88 has a band plate shape having a front-rear width that fits between the lateral ribs 83, 83 on the front and the rear of the mounting recessed portion 80 and an up-down dimension shorter than that of the holding cover 86. A locking piece 98 is disposed to protrude on a right surface at an upper end of the slide bar 88. The locking piece 98 passes through the slit 82 of the mounting recessed portion 80 to project into the main body portion 62. In the slide bar 88, an oval hole 99 is formed on the upper side, and an elongated rectangular hole 100 is formed on the lower side in the up-down direction. The oval hole 99 is penetrated by the screw boss 93 on the upper side of the holding cover 86. The elongated rectangular hole 100 is penetrated by the upper spring receiver 94 of the holding cover 86. A lower spring receiver 101 where a boss projects upward is formed at a lower end of the elongated rectangular hole 100. The slide bar 88 can slide in the up-down direction in a state where its lower end is inserted into the button receiving portion 91 from the upper side.

The coil spring 89 is interposed in the up-down direction between the boss of the upper spring receiver 94 and the boss of the lower spring receiver 101 in the elongated rectangular hole 100.

Regarding the operation portion 85, first, the operation button 87 is housed in the button receiving portion 91 of the holding cover 86, and then the slide bar 88 and the coil spring 89 are assembled to the right surface of the holding cover 86. Next, the screw bosses 93, 93 are adjusted to the screw receiving cylinders 81, 81, and then, the holding cover 86 is fitted to the mounting recessed portion 80 from the left side. Then, from inside of the main body portion 62, screws 102, 102 are screwed to the screw bosses 93, 93 that have penetrated the screw receiving cylinders 81, 81. Then, the operation portion 85 is assembled to the casing 61.

Figure 10B:
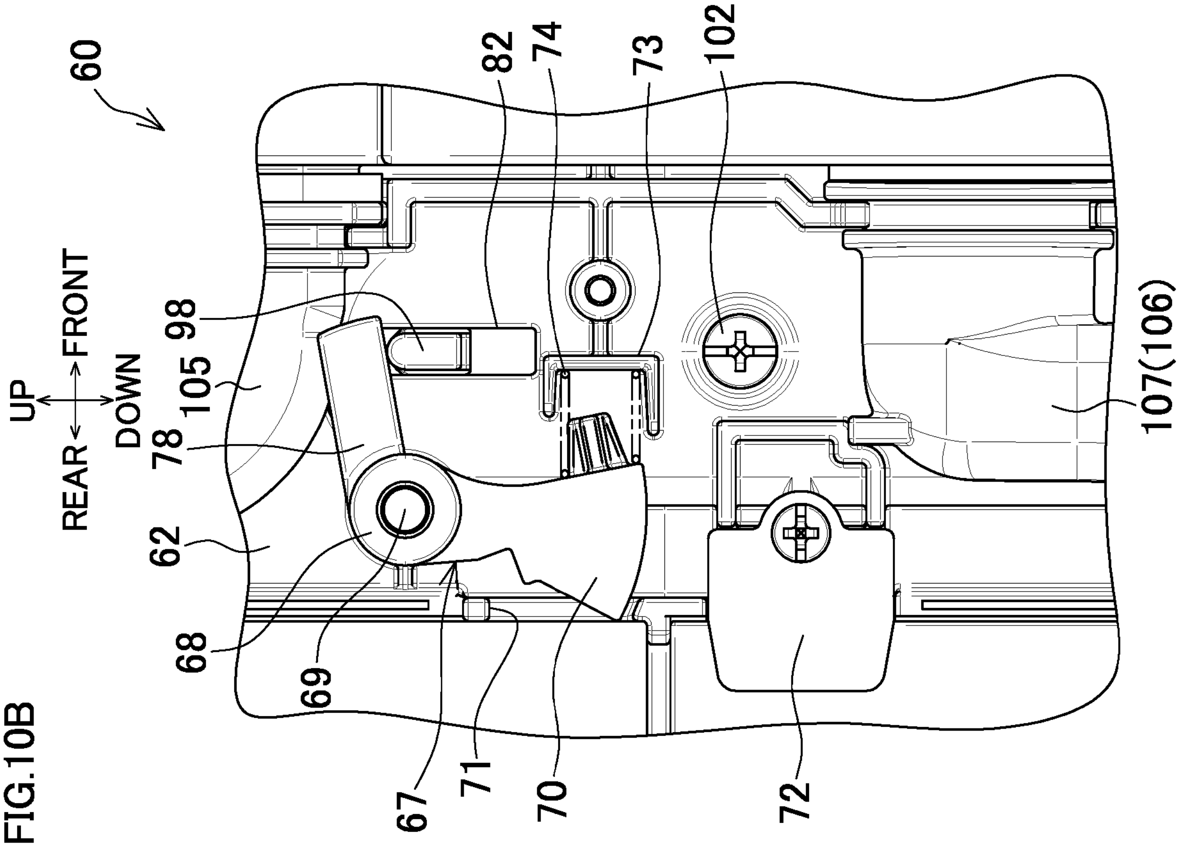
FIG. 10A and FIG. 10B are enlarged views of a stopper portion viewed from the right side with a right-side half casing omitted.
Figure 10A:
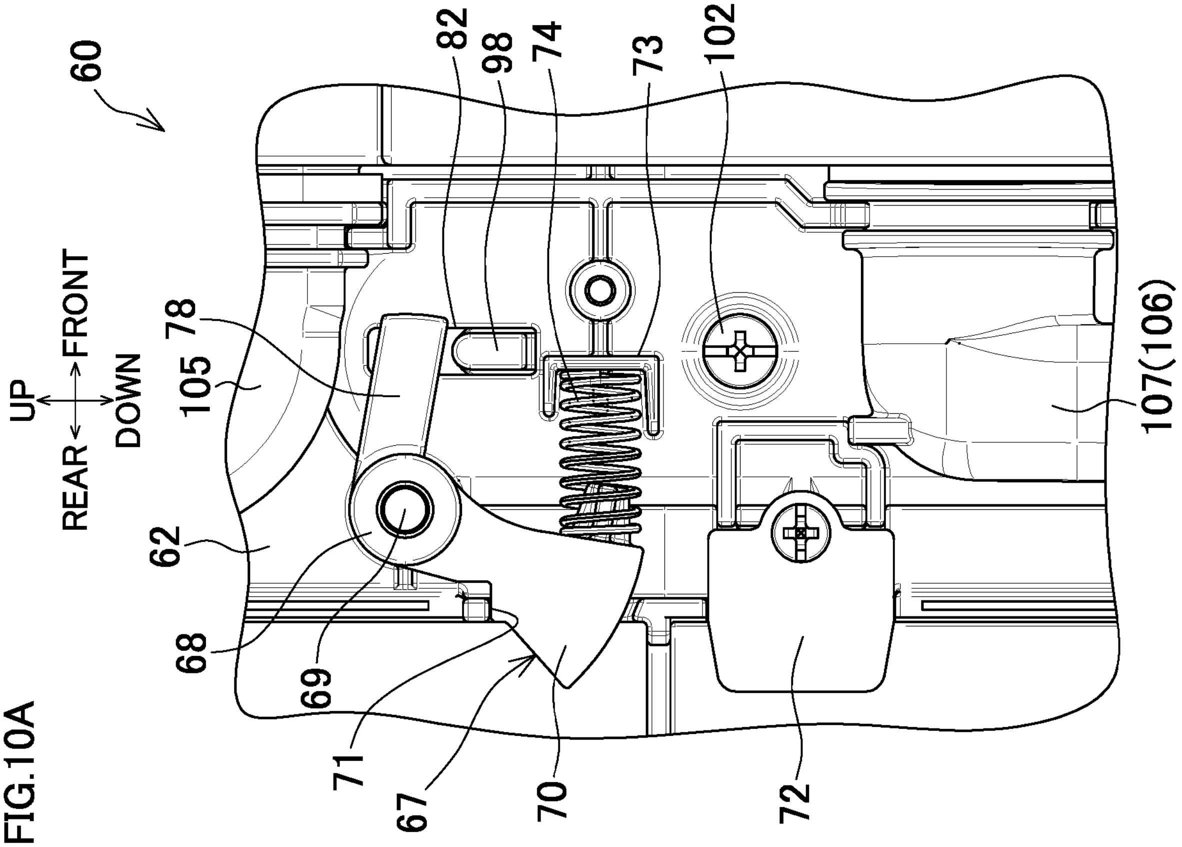

In an ordinary state, the slide bar 88 is biased downward by the coil spring 89, and the lower end is brought into contact with the upper surface of the operation button 87. By biasing of the coil spring 89 through the slide bar 88, the operation button 87 is biased to the lower limit position in FIG. 7 where it is brought into contact with a stop portion 103 disposed at the lower end of the holding cover 86. At this time, as indicated in FIG. 10A, the locking piece 98 of the slide bar 88 is positioned on the lower side of the slit 82. Inside the main body portion 62, at the locking position of the stopper 67, the linking piece 78 of the joining member 76 is positioned above the locking piece 98 projecting from the slit 82.

From here, when the operation button 87 is slid upward against the biasing of the coil spring 89, the slide bar 88 slides upward. Then, as indicated in FIG. 10B, the locking piece 98 moves upward to push up the linking piece 78. Accordingly, together with the joining member 76, the stopper 67 rotates to the left in FIG. 10A and swings to the locking release position in FIG. 10B. When upward push-up of the operation button 87 is released, the operation button 87 moves to the lower limit position together with the slide bar 88 by the biasing of the coil spring 89. Accordingly, the push-up of the linking piece 78 by the locking piece 98 is released, and the stopper 67 returns to the locking position in FIG. 10A by the biasing of the coil spring 74.

An upper side duct 105 is disposed in the front projecting portion 63. A front end of the upper side duct 105 opens forward on a front surface of the front projecting portion 63. The upper side duct 105 is routed rearward inside the front projecting portion 63 to make a U-turn inside the main body portion 62, and has its rear end opened to the front surface of the main body portion 62 below the front projecting portion 63.

A lower side duct 106 is disposed inside the main body portion 62 and the rear projecting portion 64. The lower side duct 106 is divided into a front duct portion 107 and a rear duct portion 108. The front duct portion 107 has an inverse L shape in a side view and its upper end portion facing forward opens to the front surface of the main body portion 62 below the upper side duct 105. The rear duct portion 108 has a front end portion joined to a lower end portion of the front duct portion 107 and extends rearward. A rear end portion of the rear duct portion 108 is formed in a disk shape inside the rear projecting portion 64 and has a ring-shaped opening portion 109 (see FIG. 11 and FIG. 12) opening on its upper surface.

Figure 11:
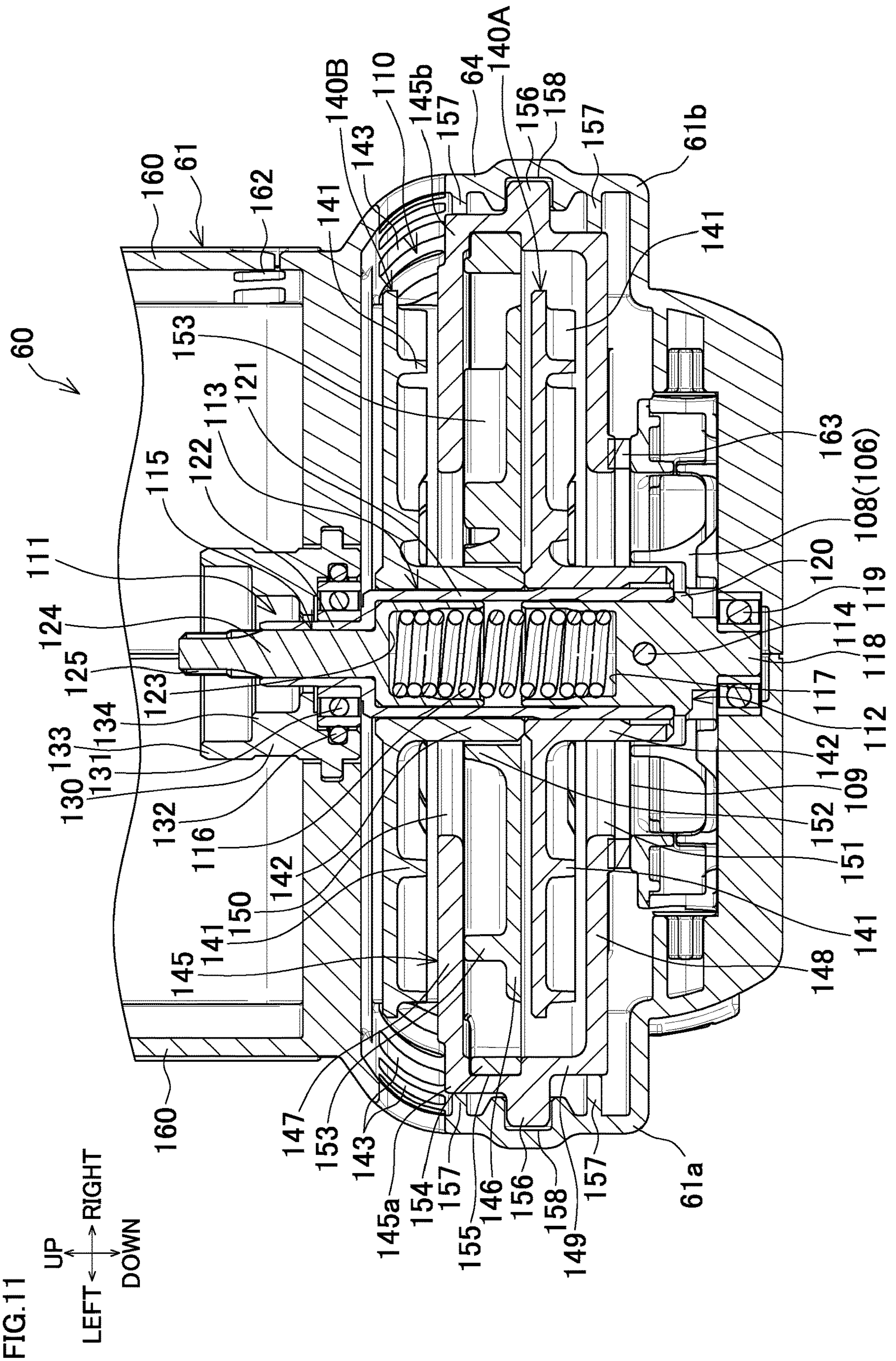
FIG. 11 is an enlarged partial cross-sectional view taken along the line B-B in FIG. 6.
Figure 12:
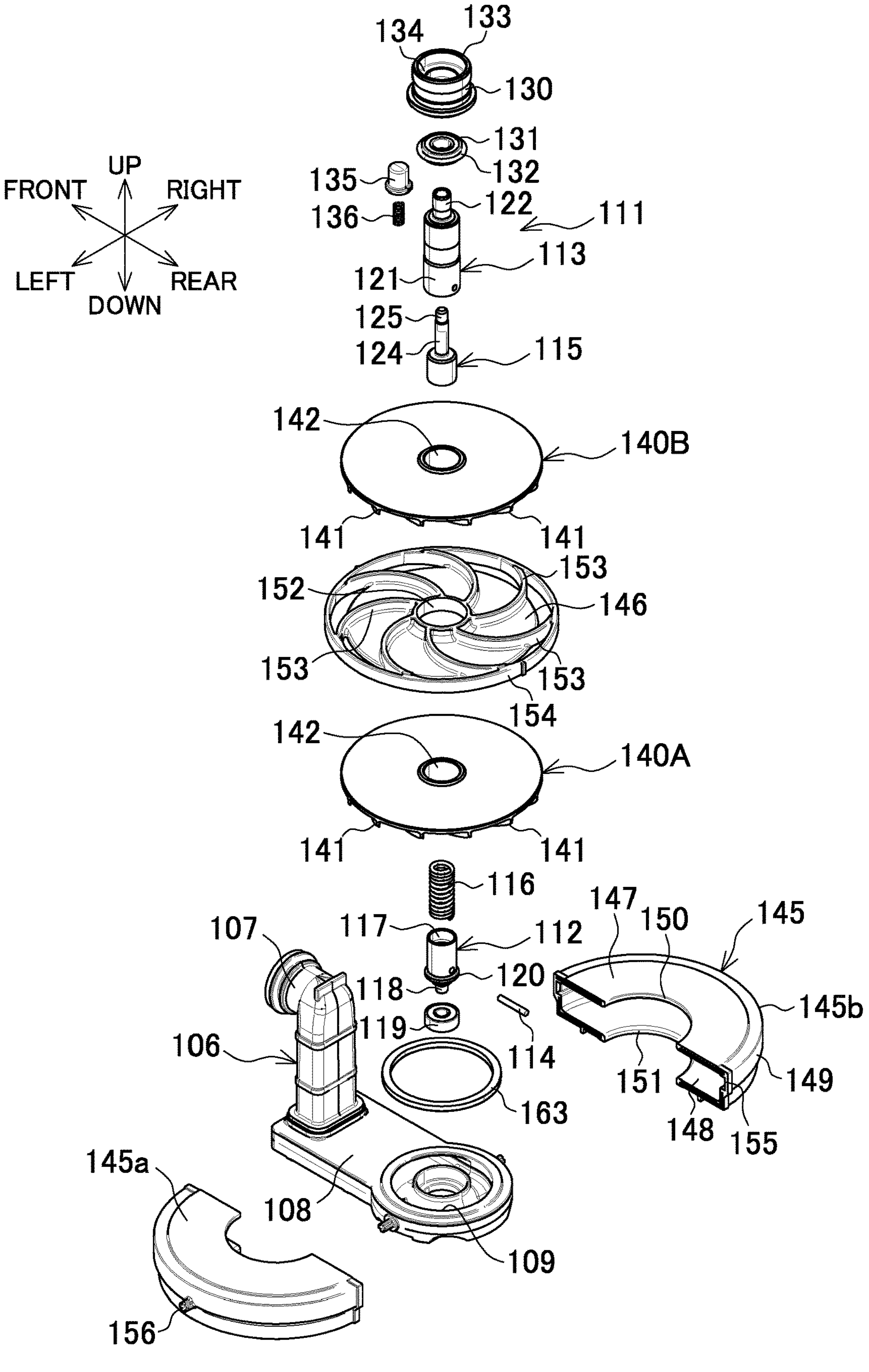
FIG. 12 is a perspective view illustrating an exploded fan shaft from an upper side.
Figure 13:
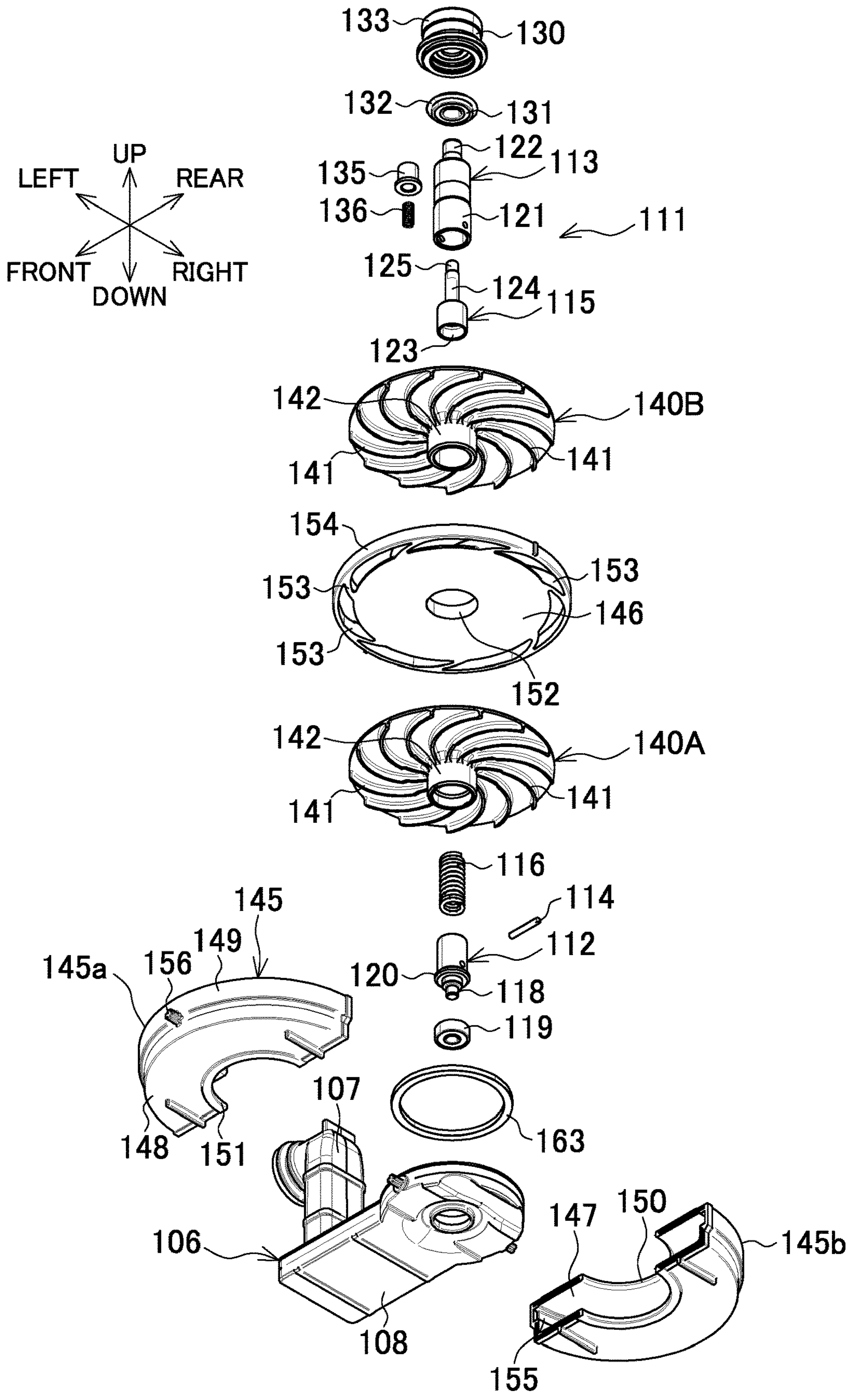
FIG. 13 is a perspective view illustrating the exploded fan shaft from a lower side.

A fan housing chamber 110 is formed on an upper side of the rear duct portion 108 inside the rear projecting portion 64. A fan shaft 111 is disposed inside the fan housing chamber 110. As indicated in FIGS. 11 to 13, the fan shaft 111 is constituted of an inner shaft 112, an outer sleeve 113, a pin 114, a connecting shaft 115, and a coil spring 116.

The inner shaft 112 includes a lower side closed-end hole 117 opening upward. A lower portion of the inner shaft 112 is a lower shaft portion 118 having a small diameter. The lower shaft portion 118 penetrates the center of the rear duct portion 108 to project downward and is supported by a bearing 119 held in a lower portion of the rear projecting portion 64. On an upper side of a lower shaft portion 118, a flange 120 having a large diameter is formed over a whole circumference.

The outer sleeve 113 has a two-staged diameter coaxially including a large diameter portion 121 on a lower side and a small diameter portion 122 on an upper side. The large diameter portion 121 has a cylindrical shape and is externally mounted to the inner shaft 112 from the upper side and has a lower end that is brought into contact with the flange 120 to be positioned. The pin 114 penetrates the large diameter portion 121 and the inner shaft 112 in a diameter direction on the lower side with respect to the lower side closed-end hole 117 and coaxially connects both of them.

The connecting shaft 115 is disposed so as to be movable in the up-down direction inside the outer sleeve 113 above the inner shaft 112. The connecting shaft 115 includes an upper side closed-end hole 123 opening downward. An upper portion of the connecting shaft 115 is an upper shaft portion 124 having a small diameter. The upper shaft portion 124 coaxially penetrates the small diameter portion 122 of the outer sleeve 113 to project its upper end upward. An outer spline 125 is formed at an upper end of the upper shaft portion 124.

The coil spring 116 is inserted in the up-down direction across the lower side closed-end hole 117 of the inner shaft 112 and the upper side closed-end hole 123 of the connecting shaft 115. A lower end of the coil spring 116 is pressed into the lower side closed-end hole 117, and an upper end of the coil spring 116 is pressed into the upper side closed-end hole 123. Accordingly, the inner shaft 112 is elastically connected to the connecting shaft 115 in the up-down direction and in a rotation direction via the coil spring 116. In the ordinary state, by the biasing of the coil spring 116, the connecting shaft 115 is biased to an upper limit position in FIG. 11 where it is brought into contact with the small diameter portion 122. The inner shaft 112 and the connecting shaft 115 are relatively rotatable in the rotation direction only by a predetermined angle in which the coil spring 116 can be torsionally deformed.

A bearing holder 130 is disposed on an upper portion of the rear projecting portion 64. The bearing holder 130 has a sleeve shape that is held by the rear projecting portion 64 and projects upward. The bearing holder 130 holds a bearing 131 via an O-ring 132. The bearing 131 supports the small diameter portion 122 of the outer sleeve 113, which coaxially penetrates the bearing 131. Accordingly, the upper shaft portion 124 of the connecting shaft 115, which coaxially penetrates the small diameter portion 122, and the bearing holder 130 are positioned to one another via the bearing 131. In the state, the upper shaft portion 124 penetrates the bearing holder 130 and causes the outer spline 125 to project upward with respect to the bearing holder 130. The small diameter portion 122 penetrates the bearing holder 130 to project up to a lower portion of the outer spline 125.

An upper inner diameter of the bearing holder 130 projecting from the rear projecting portion 64 is formed in a two-staged diameter with a small diameter on the lower side and a large diameter on the upper side. Accordingly, an engaging portion 133 having a ring shape is formed at an upper end of the bearing holder 130. A stepped portion 134 having a ring shape is formed on a lower side of the engaging portion 133. The engaging portion 133 can be inserted into the ring groove 31 disposed on the lower surface of the lower housing 6 of the hammer drill 1.

A pressing cap 135 is disposed on a front side of the bearing holder 130 on an upper surface of the rear projecting portion 64. The pressing cap 135 has a circular shape in a plan view and is biased to a projection position from the upper surface of the rear projecting portion 64 by a coil spring 136 disposed inside. The pressing cap 135 can abut on the receiving portion 32 of the lower housing 6.

In the fan housing chamber 110, a first dust collecting fan 140A and a second dust collecting fan 140B, which are two dust collecting fans adjacent with one another in the axial direction, are orthogonally mounted to the fan shaft 111. The first and second dust collecting fans 140A and 140B are both centrifugal fans. The first and second dust collecting fans 140A and 140B both have an identical shape with a plurality of whirl-shaped vanes 141, 141 . . . disposed on a lower surface of a disk. The first and second dust collecting fans 140A and 140B each rotate integrally with the fan shaft 111 by fixing a center cylindrical portion 142 to the large diameter portion 121 of the outer sleeve 113 by press fitting or the like so as to line up in the up-down direction. The first and second dust collecting fans 140A and 140B are made of metal, such as aluminum, or made of resin.

A plurality of lower side exhaust ports 143, 143 . . . are each disposed side by side in the front-rear direction on the right and left side surfaces of the rear projecting portion 64 radially outside of the second dust collecting fan 140B disposed on an upper side.

A first flow regulating member 145 and a second flow regulating member 146 are disposed inside the fan housing chamber 110.

The first flow regulating member 145 is a box-shaped body having a circular shape in a plan view that surrounds the first dust collecting fan 140A on the lower side from the up-down direction and an outside in the radial direction. The first flow regulating member 145 includes an upper side flow regulating plate 147, a lower side flow regulating plate 148, and a peripheral surface plate 149. The upper side flow regulating plate 147 is a disk positioned on the upper side of the first dust collecting fan 140A. An upper side center hole

150 into which the center cylindrical portion 142 of the second dust collecting fan 140B is coaxially and movably inserted is formed at the center of the upper side flow regulating plate 147. The lower side flow regulating plate 148 is a disk that has a diameter approximately the same as that of the upper side flow regulating plate 147 and is positioned on a lower side of the first dust collecting fan 140A. A lower side center hole 151 into which the center cylindrical portion 142 of the first dust collecting fan 140A is coaxially and movably inserted is formed at the center of the lower side flow regulating plate 148. The peripheral surface plate 149 connects outer peripheral edges of the upper side flow regulating plate 147 and the lower side flow regulating plate 148 to close the outside in the radial direction of the first dust collecting fan 140A.

The second flow regulating member 146 is held between the first dust collecting fan 140A and the second dust collecting fan 140B inside the first flow regulating member 145. The second flow regulating member 146 is a disk having a diameter slightly smaller than an outer diameter of the first dust collecting fan 140A. A center cylinder 152 that is coaxially and movably inserted into the center cylindrical portion 142 of the second dust collecting fan 140B is formed upward at the center of the second flow regulating member 146. The second flow regulating member 146 is close to the first dust collecting fan 140A with a gap in the up-down direction. A plurality of whirl-shaped ribs 153, 153 . . . having a winding direction identical to those of the first and second dust collecting fans 140A and 140B are formed on an upper surface of the second flow regulating member 146. An end portion of a radially inward of each rib 153 is connected to the center cylinder 152. An end portion of a radially outside of each rib 153 projects over an outer periphery of the second flow regulating member 146 and is connected to a retaining ring 154 disposed coaxially with the center cylinder 152. A fitting groove 155 to which the retaining ring 154 is fitted is formed over a whole periphery on an inner peripheral surface of the peripheral surface plate 149 of the first flow regulating member 145. Positioning bosses 156, 156 are disposed to protrude outward on an outer peripheral surface of the peripheral surface plate 149 on the right and left sides of the first flow regulating member 145.

The second flow regulating member 146 is assembled to the first flow regulating member 145 in a state where the retaining ring 154 is fitted to the fitting groove 155. However, as indicated in FIGS. 11 to 13, the first flow regulating member 145 is divided into two of the right and left sides, and a half member 145*a* is held by the half casing 61*a*, and a half member 145*b* is held by the half casing 61*b*.

Accordingly, in assembling, the first and second dust collecting fans 140A and 140B are assembled to the fan shaft 111 in a state where the center cylindrical portion 142 of the second dust collecting fan 140B is movably inserted into the center cylinder 152 of the second flow regulating member 146. Next, while the retaining ring 154 is sandwiched by the left and right half members 145*a* and 145*b* of the first flow regulating member 145, the retaining ring 154 is fitted to the fitting groove 155 and positioned to the first flow regulating member 145. Then, the second flow regulating member 146 and the first dust collecting fan 140A are covered by the half members 145*a*, 145*b*. Then, the first flow regulating member 145 is sandwiched by the half casing 61*a* on the left side and the half casing 61*b* on the right side together with the fan shaft 111 where the bearing holder 130 and the bearings 119 and 131 are assembled, and then is screwed. A pair of upper and lower positioning ribs 157, 157 and positioning depressed portions 158, 158 are formed on an inner peripheral surface of the half casings 61*a*, 61*b*. The pair of upper and lower positioning ribs 157, 157 perform positioning by receiving an outer peripheral surface of the half members 145*a*, 145*b*. The positioning bosses 156, 156 disposed on the half members 145*a*, 145*b* fit to the positioning depressed portions 158, 158. Accordingly, adjusting the positioning bosses 156, 156 to the positioning depressed portions 158, 158 and fitting the half members 145*a*, 145*b* to the positioning ribs 157, 157 ensures smooth assembly.

In an assembled state described above, the first flow regulating member 145 is coaxially arranged above the opening portion 109 of the rear duct portion 108. A ring-shaped seal member 163 is interposed between an outer peripheral edge of the opening portion 109 and an inner peripheral edge of the lower side flow regulating plate 148. Accordingly, the opening portion 109 of the rear duct portion 108 is communicated with the inside of the first flow regulating member 145 via the lower side center hole 151 of the lower side flow regulating plate 148.

Thus, inside the fan housing chamber 110, as indicated by dotted arrows in FIG. 3, in association with rotation of the first and second dust collecting fans 140A and 140B, an airflow passage R1 where air flows from the lower side center hole 151 of the lower side flow regulating plate 148 of the first flow regulating member 145 to the lower side exhaust ports 143 of the rear projecting portion 64 is formed. In the airflow passage R1, the air that enters the inside of the first flow regulating member 145 from the lower side center hole 151 goes round on an upper side of the first dust collecting fan 140A after flowing radially outside between the lower side flow regulating plate 148 and the first dust collecting fan 140A. Next, after flowing radially inward between the second flow regulating member 146 and the upper side flow regulating plate 147, the air goes round on an upper side of the upper side flow regulating plate 147 from the upper side center hole 150 of the upper side flow regulating plate 147. Then, the air flows radially outside between the upper side flow regulating plate 147 and the second dust collecting fan 140B and is discharged from the lower side exhaust ports 143.

As indicated in FIG. 5, side plates 160, 160 are disposed on the right and left sides to extend on the rear side of the main body portion 62 and on the upper side of the rear projecting portion 64. Between the side plates 160, 160, the motor housing 3 and the lower housing 6 of the hammer drill 1 can be fitted. Engaging projections 161, 161 are formed in the up-down direction inside of rear ends of the side plates 160, 160. The engaging projections 161, 161 can be engaged with the engaging grooves 21, 21 disposed on the side surfaces of the lower housing 6 from the lower side. A plurality of upper side exhaust ports 162, 162 . . . are disposed side by side in the front-rear direction on the lower side of the right-side side plate 160.

As indicated in FIG. 2, the dust box 65 is a box-shaped body mounted to the casing 61 from the front. The dust box 65 is constituted by hinge-connecting a lid body 165 and a box main body 166 at their lower ends. The lid body 165 has a filter 167 on a front inside surface, and the box main body 166 covers the filter 167 from the front.

A locking shaft 168 is disposed in the right-left direction at a front lower end of the main body portion 62. A receiving depressed portion 169 is formed in the right-left direction on a lower surface of the box main body 166. The dust box 65 is attachably/removably mounted to the casing 61 by causing the receiving depressed portion 169 to engage with the locking shaft 168 and an elastic piece 170 disposed at an upper end of the lid body 165 to be locked to a lower surface of the front projecting portion 63. In the lid body 165, an inlet 171 is disposed on an upper side, and an outlet 172 is disposed on a lower side. The outlet 172 is disposed on the rear side of the filter 167. In a mounted state of the dust box 65, the inlet 171 is connected to a rear end portion of the upper side duct 105, and the outlet 172 is connected to an upper end of the front duct portion 107 of the lower side duct 106.

The dust collection system is described.

Figure 14:
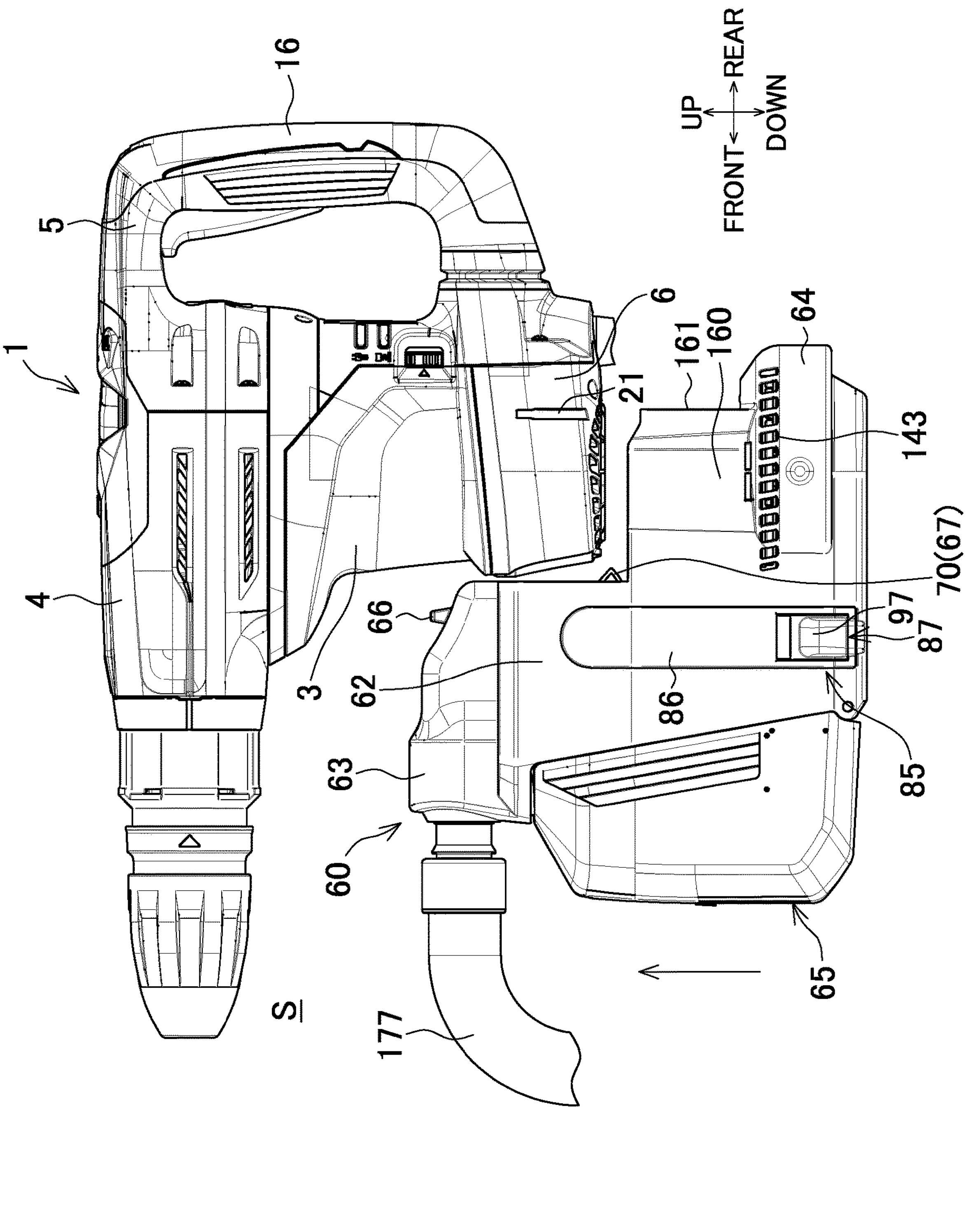
FIG. 14 is a side view illustrating a state where the dust collecting attachment is mounted to the hammer drill.

The dust collecting attachment 60 and the dust collection system S are constituted as described above. As indicated in FIG. 14, in a state where the rear projecting portion 64 is positioned below the lower housing 6, upper-lower positions between the engaging projections 161, 161 of the side plates 160, 160 and the engaging grooves 21, 21 of the lower housing 6 are adjusted. Subsequently, the dust collecting attachment 60 is relatively moved in the up-down direction with respect to the hammer drill 1. Then, the engaging projections 161, 161 are fitted to the engaging grooves 21, 21 from the lower side, and the engaging projecting portion 66 of the main body portion 62 is inserted into the engaging depressed portion 12 of the motor housing 3 from the lower side. The locking plate 72 is locked to the receiving groove 22 of the lower housing 6 from the lower side.

At this time, the stopper 67 interferes with the lower housing 6 relatively moving downward and swings from the locking position to the locking release position to allow relative movement of the dust collecting attachment 60. Then, as indicated in FIG. 2, at a mounting position of the dust collecting attachment 60, the locking portion 70 of the stopper 67 that has returned to the locking position is locked to the receiving surface portion 13 of the motor housing 3 from the upper side. Accordingly, downward movement of the dust collecting attachment 60 relative to the hammer drill 1 is restricted, and mounting of the dust collecting attachment 60 is completed.

In the mounting, as also indicated in FIG. 3, the upper shaft portion 124 of the connecting shaft 115 in the fan shaft 111 penetrates the through hole 30 of the lower housing 6 and causes the outer spline 125 to engage with the inner spline 29 of the connecting sleeve 28 together with completion of the mounting. Accordingly, the fan shaft 111 is connected integrally to the rotation shaft 9 in the rotation direction. When a phase between the outer spline 125 and the inner spline 29 does not match, the connecting shaft 115 moves downward against the biasing of the coil spring 116. When the connecting sleeve 28 rotates together with the rotation shaft 9, and the phase matches, the connecting shaft 115 moves up to cause the outer spline 125 to engage with the inner spline 29.

During the connection, the engaging portion 133 disposed in the bearing holder 130 in the rear projecting portion 64 is inserted into the ring groove 31 disposed on the bottom surface of the lower housing 6. Accordingly, the connecting shaft 115 moves up without being inclined in its course to cause the upper shaft portion 124 to smoothly connect to the rotation shaft 9. Together with completion of the connection, the stepped portion 134 of the bearing holder 130 abuts on the bottom surface of the lower housing 6 to restrict further upward movement.

During the mounting, the pressing cap 135 abuts on the receiving portion 32 on the lower surface of the lower housing 6 and moves down inside the rear projecting portion 64 against the biasing of the coil spring 136. When the mounting is completed, the pressing cap 135 presses the receiving portion 32 from the lower side by the biasing of the coil spring 136. Accordingly, rattling of the dust collecting attachment 60 in the mounted state is suppressed.

Here, the bit B mounted to the hammer drill 1 is a dust suction bit having a dust suction passage 175, which has a suction opening that opens to a front end in its axial center, and having a hose mounting portion 176 externally mounted on its outer periphery. Accordingly, a flexible hose 177 is connected between the front end of the upper side duct 105 of the dust collecting attachment 60 and the hose mounting portion 176 of the bit B.

Connecting by the flexible hose 177 forms a dust collecting route R in which air flows across the bit B and the dust collecting attachment 60. As indicated by the dotted arrows in FIG. 2, the dust collecting route R is a route from the dust suction passage 175 to the lower side exhaust ports 143 via the hose mounting portion 176, the flexible hose 177, the upper side duct 105, the dust box 65, the lower side duct 106, and the airflow passage R1 in the fan housing chamber 110.

During the performing work using the dust collection system S, the switch lever 18 of the hammer drill 1 is pushed in to turn on the switch 17 in a state where the tip of the bit B is pressed against a surface to be processed of a workpiece. Then, the motor 8 is driven to rotate the rotation shaft 9, resulting in causing the intermediate shaft 36 and the crankshaft 37 to rotate. Here, since the piston 45 constantly reciprocates regardless of whether the hammer drill mode or the hammer mode is selected, the bit B is hammered by the striker 49 in conjunction with the piston 45 via the impact bolt 50.

Together with the rotation of the rotation shaft 9, the fan shaft 111 and the first and second dust collecting fans 140A and 140B also integrally rotate. Then, the dust collecting route R becomes negative pressure, and a suctioning force is generated at the opening of the dust suction passage 175 of the bit B. Accordingly, dust generated from the workpiece is suctioned into the dust suction passage 175 and enters the inside of the upper side duct 105 through the hose mounting portion 176 and the flexible hose 177. Then, the dust enters the inside of the dust box 65 and is captured in the filter 167 to be accumulated inside the box main body 166.

When the rotation shaft 9 starts rotation, the connecting shaft 115 connected to the rotation shaft 9 also integrally rotates. The inner shaft 112 and the outer sleeve 113 are joined to the connecting shaft 115 via the coil spring 116. Accordingly, the inner shaft 112 and the outer sleeve 113 do not rotate simultaneously with the connecting shaft 115, but start rotating with a momentary delay due to torsional deformation of the coil spring 116. Therefore, it is possible to reduce the impact in the rotation direction transmitted from the rotation shaft 9 at a time of activation.

Inside the fan housing chamber 110 of the dust collecting attachment 60, the air entering the inside of the first flow regulating member 145 from the opening portion 109 of the lower side duct 106 passes through the airflow passage R1 indicated in FIG. 3 and is discharged from the lower side exhaust ports 143. Here, since the first and second dust collecting fans 140A and 140B rotate, it is possible to generate a large suctioning force even when the rotation speed of the rotation shaft 9 is low.

In particular, in the first flow regulating member 145, the upper side flow regulating plate 147 positioned between the first dust collecting fan 140A and the second dust collecting fan 140B is disposed. Accordingly, the air that has flowed radially outside the first dust collecting fan 140A is surely guided to the radially inward upper side center hole 150 by the upper side flow regulating plate 147 and flows to a center side of the second dust collecting fan 140B, which is referred to as "air a."

The second flow regulating member 146 is disposed between the upper side flow regulating plate 147 and the first dust collecting fan 140A. Thus, the air a flows radially inward between the upper side flow regulating plate 147 and the second flow regulating member 146. Accordingly, the air a is less likely to be brought into contact with the rotating first dust collecting fan 140A, and turbulence is avoided. Specifically, since the whirl-shaped ribs 153 are formed on the upper surface of the second flow regulating member 146, it is possible to smoothly guide the air a to the upper side center hole 150 as the swirl flow.

On the other hand, on the side of the hammer drill 1, the power-tool-side fan 26 rotates together with the rotation shaft 9. Then, external air is suctioned from the power-tool-side intake ports 14. The suctioned air flows between the outer housing 4 and the inner housing 2 to cool the inner housing 2. Afterwards, after passing the motor 8 to cool the motor 8, the air reaches the power-tool-side fan housing chamber 23 through the ventilation port 25 and is discharged downward from the power-tool-side exhaust port 27. The side plates 160, 160 of the dust collecting attachment 60 are positioned on the right and left of the lower housing 6. Since the upper side exhaust ports 162 are formed in the right-side side plate 160, a part of the discharged air flows through the lower side of the lower housing 6 and is discharged from the right-side upper side exhaust ports 162. The other air is discharged to the rear side where there are no side plates 160, 160.

When the dust collecting attachment 60 is removed from the hammer drill 1, in the operation portion 85 of the main body portion 62, as described above, the operation button 87 is slid upward to move the stopper 67 to the locking release position shown in FIG. 10B. As indicated in FIG. 7, a pair of upper and lower finger hook ribs 178, 178 extending in the front-rear direction are disposed in the right side surface lower portion of the main body portion 62 that is on the right-left opposite side of the operation button 87. Accordingly, by hooking the middle finger of one hand that grips the lower portion of the main body portion 62 on the finger hook ribs 178, 178 and setting the thumb to the finger abutment portion 97 of the operation button 87, push-up of the operation button 87 can be smoothly performed.

When the stopper 67 moves to the locking release position, the locking portion 70 is removed from the receiving surface portion 13 to allow relative movement of the dust collecting attachment 60. Accordingly, conversely to the time of mounting in FIG. 14, the dust collecting attachment 60 is relatively moved to a separation direction from the hammer drill 1. Then, the engaging projections 161, 161 of the side plates 160, 160 are removed from the engaging grooves 21, 21 of the lower housing 6, and the locking plate 72 is also separated downward from the receiving groove 22. Simultaneously, the engaging projecting portion 66 of the main body portion 62 is extracted from the engaging depressed portion 12 of the motor housing 3. Thus, removal of the dust collecting attachment 60 is completed.

When the dust accumulated inside the dust box 65 is discarded, the elastic piece 170 is pressed down to release the locking with the front projecting portion 63. Then, by directly tilting the dust box 65 forward about the locking shaft 168, the dust box 65 can be removed from the casing 61. By opening the lid body 165, the dust accumulated inside the box main body 166 can be discarded.

An effect according to the disclosure of a plurality of stages of dust collecting fans is described.

The dust collecting attachment 60 according to a first configuration and the hammer drill 1 with the dust collecting attachment 60 according to a second configuration have the first and second dust collecting fans 140A and 140B, the upper side duct 105, and the dust box 65. The first and second dust collecting fans 140A and 140B are one example of a dust collecting fan. The upper side duct 105 is one example of a suctioning portion and causes a suctioning force to be generated by the rotation of the first and second dust collecting fans 140A and 140B. The dust box 65 is one example of a dust collecting portion and captures dust suctioned from the upper side duct 105. By mounting the dust collecting attachment 60 to the hammer drill 1 having the motor 8, the fan shaft 111 is connected to the rotation shaft 9 of the motor 8 to rotate the first and second dust collecting fans 140A and 140B.

The dust collecting fans are disposed in two stages, which are one example of a plurality of stages, as the first and second dust collecting fans 140A and 140B in the axial direction of the fan shaft 111.

According to the configuration, a large suctioning force can be ensured by the two-stage first and second dust collecting fans 140A and 140B, and necessity of increasing the size of the first and second dust collecting fans 140A and 140B is eliminated. Accordingly, even when power is obtained from the motor 8 of the hammer drill 1, the required suction force can be obtained without increasing the size.

The first and second dust collecting fans 140A and 140B are centrifugal fans. The first flow regulating member 145 that guides air from the outer peripheral side of the first dust collecting fan 140A of the first stage to the center side of the second dust collecting fan 140B of the second stage is disposed between the first and second dust collecting fans 140A and 140B adjacent in the axial direction.

Accordingly, even when the two-stage first and second dust collecting fans 140A and 140B, which are centrifugal fans, are disposed, the airflow from the first dust collecting fan 140A to the second dust collecting fan 140B can be maintained.

Between the first dust collecting fan 140A of the first stage and the upper side flow regulating plate 147 of the first flow regulating member 145, the second flow regulating member 146 that partitions between the downstream-side surface of the first dust collecting fan 140A and the flow of the air a by the first flow regulating member 145 is disposed.

Accordingly, contact between the rotating first dust collecting fan 140A and the air a flowing radially inward is avoided, and turbulence is less likely to occur.

The whirl-shaped ribs 153 are disposed upright on the surface of the side of the upper side flow regulating plate 147 of the first flow regulating member 145 in the second flow regulating member 146.

Accordingly, the swirl flow can be generated in the air a to smoothly guide the air a radially inward.

The first flow regulating member 145 and the second flow regulating member 146 are secured with one another.

Accordingly, assembling and positioning of both the flow regulating members 145 and 146 can be easily performed.

The fan shaft 111 separately includes the connecting shaft 115 connected to the rotation shaft 9. The connecting shaft 115 is connected to the fan shaft 111 in a state where it is movable in the axial direction and is biased to the connecting side with the rotation shaft 9 via the coil spring 116, which is one example of an elastic member.

Accordingly, when the dust collecting attachment 60 is mounted to the hammer drill 1, the impact when the connecting shaft 115 is connected to the rotation shaft 9 can be reduced.

The fan shaft 111 and the connecting shaft 115 are relatively rotatable only by a predetermined angle around the shaft.

Accordingly, the impact in the rotation direction can be reduced when the rotation shaft 9 is activated and the connecting shaft 115 integrally rotates.

The first and second dust collecting fans 140A and 140B have an identical shape.

Accordingly, even when two dust collecting fans are used, cost increase can be suppressed, and also assembly errors do not occur.

The dust collecting fans are disposed in two stages in the axial direction.

Accordingly, the necessary suctioning force can be obtained with minimum configuration.

When the fan shaft 111 is connected to the rotation shaft 9, the engaging portion 133 that engages with the hammer drill 1 to center the fan shaft 111 with respect to the rotation shaft 9 is disposed.

Accordingly, the fan shaft 111 can be smoothly connected to the rotation shaft 9 when the dust collecting attachment 60 is mounted to the hammer drill 1.

The engaging portion 133 is disposed in the bearing holder 130, which is one example of a bearing holding member, that holds the bearing 131 supporting the fan shaft 111, and the fan shaft 111 and the bearing holder 130 are positioned to one another via the bearing 131.

Accordingly, the fan shaft 111 and the engaging portion 133 are coaxially positioned with one another, and centering by the engaging portion 133 can be accurately performed.

In the disclosure according to the plurality of stages of dust collecting fans, the following modifications are possible.

The dust collecting fans are not limited to two stages, and three or more stages can be disposed. In this case, it is only necessary that the first and second flow regulating members are each disposed between the dust collecting fans adjacent in the axial direction. However, it is not necessary to dispose the first and second flow regulating members between all the adjacent dust collecting fans.

The respective dust collecting fans do not have to have an identical shape in all as in the above-described embodiment.

Any one of or both of the first flow regulating member and the second flow regulating member can be omitted.

The first flow regulating member does not have to have a box-shaped body as in the above-described embodiment, and it is only necessary that it has a shape at least including a structure corresponding to the upper-side flow regulating plate. In this case, the first flow regulating member does not have to have a half-divided shape in the right and left.

The second flow regulating member does not have to have a whirl-shaped rib as in the above-described embodiment. The second flow regulating member may be secured separately from the first flow regulating member by omitting the retaining ring. The second flow regulating member may have a half-divided shape like the first flow regulating member in the above-described embodiment.

The separation structure between the fan shaft and the connecting shaft is not limited to the above-described embodiment. For example, a structure in which the connecting shaft is externally connected to the fan shaft, or a structure in which the fan shaft and the connecting shaft are opposing in an axial direction may be employed. The connection by the coil spring may also be changed according to a separation structure. An elastic member other than the coil spring may be used.

The fan shaft does not have to be the structure in which the connecting shaft is separated as in the above-described embodiment.

The connecting structure between the connecting shaft and the rotation shaft is not limited to the spline structure in the above-described embodiment. For example, the connecting structure may have a projecting portion in a diameter direction in one shaft and a depressed portion in the diameter direction in the other shaft such that they can be connected. A direction of the connection is not limited to an up-down direction. Depending on an arrangement of a motor of an electric power tool, a connecting shaft and a rotation shaft may be connected in a front-rear direction.

The rotation shaft may be a rotation shaft other than the rotation shaft of the motor.

The engaging portion for centering the fan shaft does not have to be disposed on the bearing holder but may be separately disposed on the casing of the dust collecting attachment.

The dust collecting attachment of the disclosure is not limited to the structure where it is removably attachable to the electric power tool by relative movement in the up-down direction. The dust collecting attachment of the disclosure may have a structure where it is attached to and removed from the electric power tool by, for example, the relative movement in the front-rear direction or in the right-left direction. Accordingly, the structure of the casing can be changed as necessary.

An effect according to the disclosure of the dust collection system is described.

The dust collection system S of the above-described embodiment includes the hammer drill 1 and the dust collecting attachment 60. The dust collecting attachment 60 is mounted to the hammer drill 1 for collecting dust generated during using the hammer drill 1. The dust collecting attachment 60 includes the upper side duct 105, which is one example of a suctioning portion, and the dust box 65, which is one example of a dust collecting portion, that captures the dust suctioned from the upper side duct 105.

The dust collecting attachment 60 is removably attachable to the hammer drill 1 by the relative movement in a predetermined direction relative to the hammer drill 1. The dust collecting attachment 60 has the stopper 67, which is one example of a locking member, locked to the hammer drill 1 to avoid dropping off from the hammer drill 1 in a mounted state to the hammer drill 1 and the operation button 87, which is one example of an operation member, capable of releasing the lock by the stopper 67 by a release operation in a predetermined direction.

The predetermined direction for attaching/removing the dust collecting attachment 60 to/from the hammer drill 1 and the predetermined direction for releasing operation of the operation button 87 are both the up-down direction.

According to the configuration, when the dust collecting attachment 60 is removed, after the operation button 87 is slid upward, the casing 61 is slid downward. Accordingly, the operation directions are the same up-down direction with one another, and thus, the workability related to removal of the dust collecting attachment 60 is improved.

Between the stopper 67 and the operation button 87, the slide bar 88, which is one example of an intermediate member, that causes the stopper 67 to move to the locking release position, which is one example of a locking release position, in conjunction with the release operation of the operation button 87 is disposed.

Accordingly, the operation button 87 can be disposed at a position apart from the stopper 67. Thus, the position of the operation button 87 is less likely to be restricted, and the operation button 87 can be disposed at a position where it is easily operated.

The stopper 67 rotates in the front-rear direction to engage with/disengage from the receiving surface portion 13 of the hammer drill 1.

Accordingly, it is possible to easily avoid drop-off of the dust collecting attachment 60 by locking and to easily release the locking.

As guiding portions that engage with one another in the up-down direction to guide the relative movement of the dust collecting attachment 60 when the dust collecting attachment 60 is attached or removed, the engaging grooves 21, 21 and the engaging projections 161, 161 are disposed on both the right and left sides, and the receiving groove 22 and the locking plate 72 are disposed at the center in the right-left direction, at three places in the hammer drill 1 and the dust collecting attachment 60.

Accordingly, the up and down movements in accordance with attachment and removal of the dust collecting attachment 60 are stably and smoothly performed.

The receiving groove 22 and the locking plate 72, which are the central guiding portions, are disposed immediately below the stopper 67.

Accordingly, possibility of deviation of the positional relationship between the stopper 67 and the receiving surface portion 13 is eliminated.

Upward operation of the operation button 87 can release the locking by the stopper 67.

Accordingly, unintentional release of the locking due to erroneous operation of the operation button 87 is less likely to occur.

The hose mounting portion 176 communicated with the suction opening for dust is disposed to the bit B, which is one example of a tool bit, mounted to the hammer drill 1, and the flexible hose 177 is connected between the upper side duct 105 of the dust collecting attachment 60 and the hose mounting portion 176.

Accordingly, even when the flexible hose 177 is connected to the hose mounting portion 176, the attachment/removal of the dust collecting attachment 60 is possible without being hindered by the flexible hose 177.

The operation button 87 is disposed on the left side surface of the dust collecting attachment 60, and the finger hook ribs 178, which are one example of a finger hook portion, is disposed on the right side surface of the dust collecting attachment 60.

Accordingly, the attachment/removal operation of the dust collecting attachment 60 can be easily performed by sandwiching the operation button 87 and the finger hook ribs 178.

The dust collecting attachment 60 includes the first and second dust collecting fans 140A and 140B. In the mounted state to the hammer drill 1, the fan shaft 111 is connected to the rotation shaft 9 that rotates in association with driving of the motor 8 disposed in the hammer drill 1, thus allowing integral rotation of the first and second dust collecting fans 140A and 140B with the rotation shaft 9.

Accordingly, power of the first and second dust collecting fans 140A and 140B can be obtained from the motor 8 of the hammer drill 1, resulting in simplification and weight reduction of the dust collecting attachment 60.

In the disclose of the dust collection system, the following modifications can be employed.

The intermediate member is not limited to the slide bar of the above-described embodiment. The intermediate member may be formed of, for example, one or more link members. The intermediate member can be omitted.

The locking member is not limited to the structure of swinging in the front-rear direction to be engaged with and disengaged from the electric power tool like the stopper of the above-described embodiment. For example, the locking member may be disposed so as to be slidable in the front-rear direction to be engaged with and disengaged from the electric power tool.

In the above-described embodiment, the guiding portions have the depressed portions, namely the engaging depressed portion, the engaging groove, and the receiving groove, on the electric power tool side and projecting portions, namely the engaging projecting portion, the engaging projection, and the locking plate, on the dust collecting attachment side. However, the unevenness may be reversed in some or all of the guiding portions. The number of guiding portions can be increased or decreased, or their positions can be changed.

The operation member may be disposed on the right side surface of the dust collecting attachment, not on the left side surface of the dust collecting attachment like the operation button of the above-described embodiment. In this case, the finger hook portion is disposed on the left side surface. However, the finger hook portion may be omitted.

The dust collecting attachment in the disclosure does not have to include a plurality of stages of dust collecting fans.

The dust collecting attachment in the disclosure does not have to obtain power by connecting the fan shaft to the rotation shaft of the electric power tool side. For example, the dust collecting attachment may have a motor for the dust collecting fans disposed in the casing and rotates the motor by obtaining power from the electric power tool.

In the above-described embodiment, while the locking by the stopper can be released by sliding the operation button of the operation portion upward, the sliding direction of the operation button may be reversed from the embodiment. The following describes its modification example. Since the configuration of the dust collection system other than the operation portion is the same as that of the above-described embodiment, the operation portion will be mainly described. Same reference numerals are given to the components identical to those of the above-described embodiment, and redundant explanations are omitted.

Figure 15:
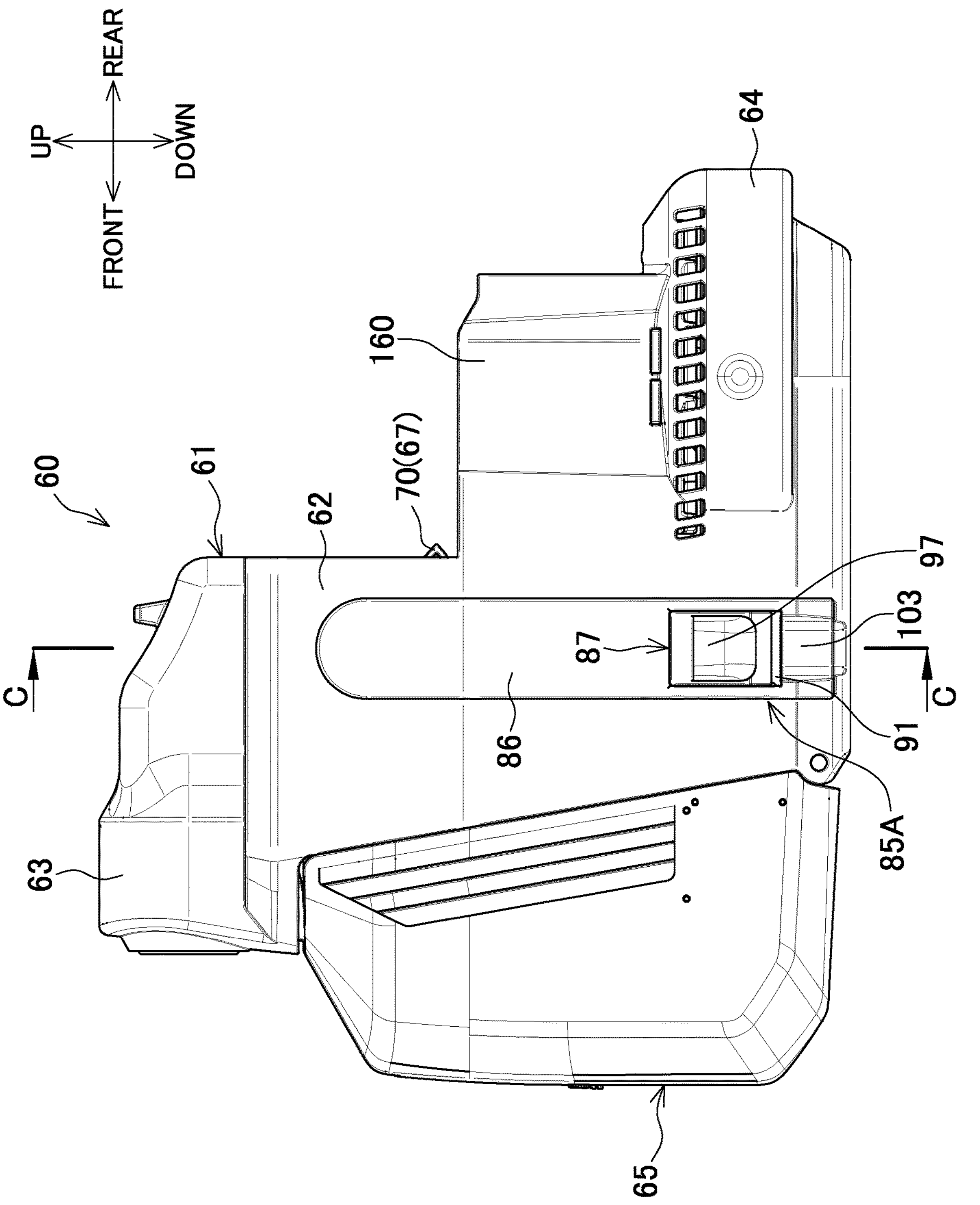
FIG. 15 is a side view of a dust collecting attachment according to a modification example.
Figure 16:
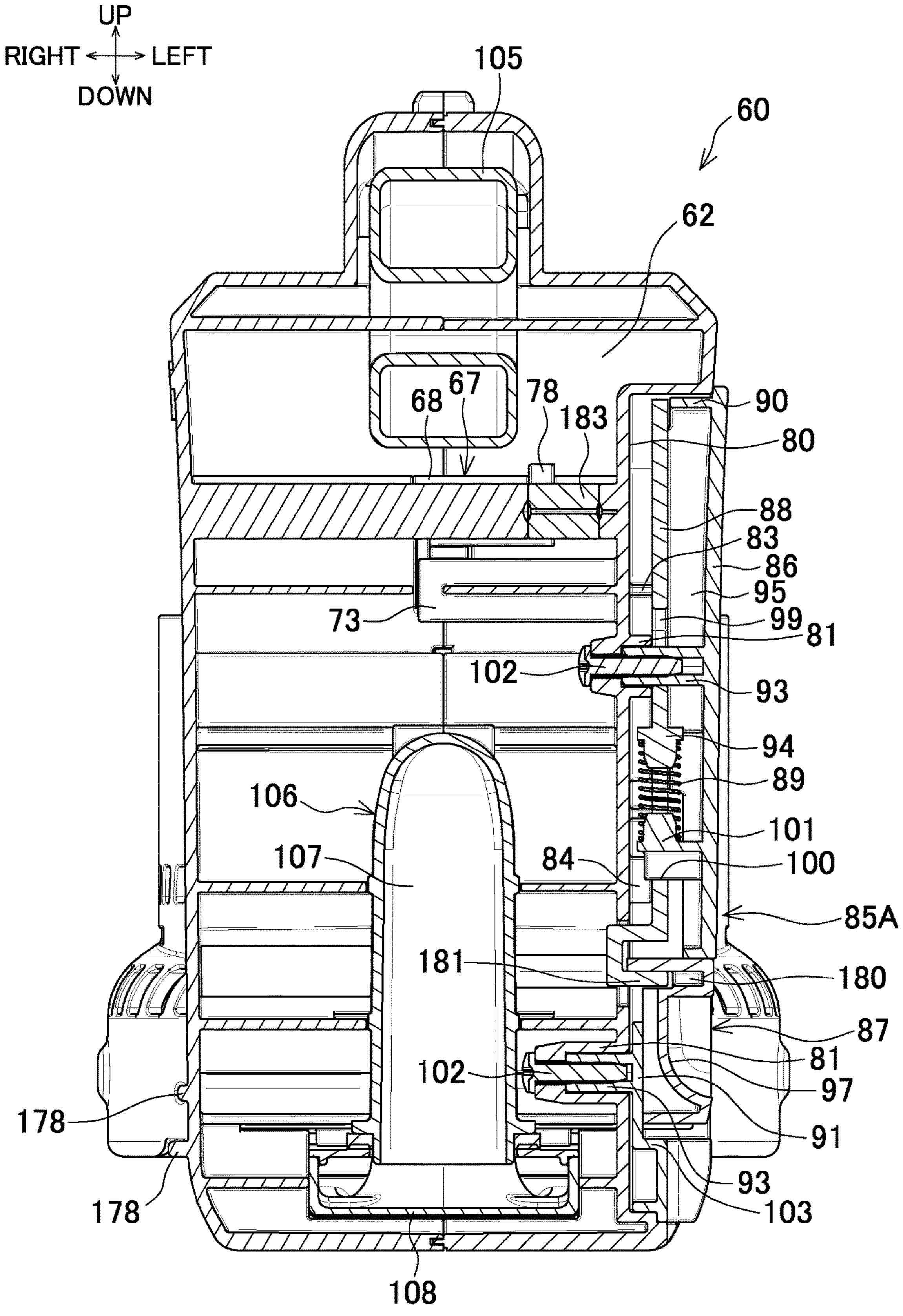
FIG. 16 is a cross-sectional view taking along the line C-C in FIG. 15.

In an operation portion 85A of the dust collecting attachment 60 indicated in FIGS. 15 and 16, a locking groove 180 is formed in the front-rear direction on the upper right surface of the operation button 87. At the lower end of the slide bar 88, a locking plate portion 181 is disposed such that the locking plate portion 181 goes around the upper end of the operation button 87 from the right side and is locked in the locking groove 180. Accordingly, the operation button 87 and the slide bar 88 can integrally move in the up-down direction.

In the operation portion 85A, the upper spring receiver 94 is disposed in the slide bar 88, and the lower spring receiver 101 is disposed in the holding cover 86. Accordingly, in the ordinary state, the operation button 87 and the slide bar 88 are biased to the upper limit position in FIGS. 15 and 16 where the upper end of the operation button 87 abuts on the upper-side inner surface of the button receiving portion 91.

Figure 17B:
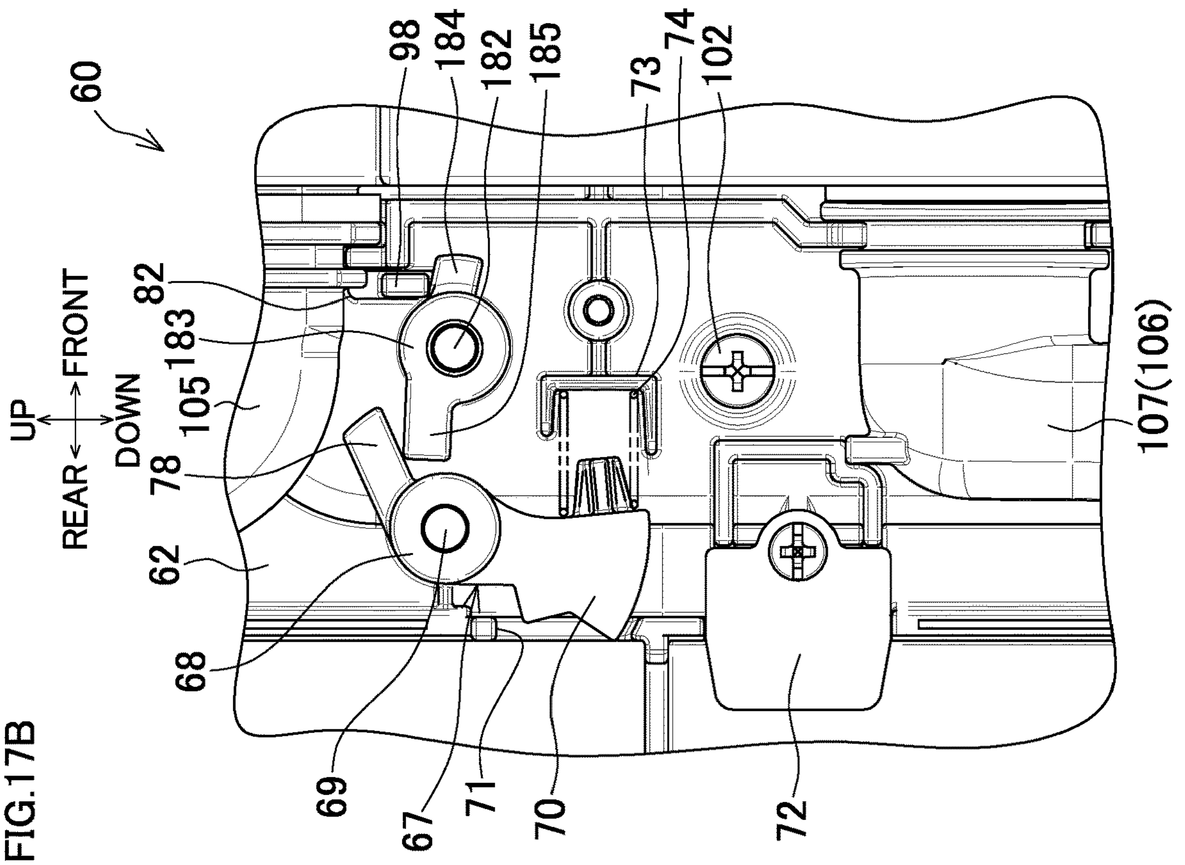
FIG. 17A and FIG. 17B are enlarged views of a stopper portion viewed from the right side with a right-side half casing omitted.
Figure 17A:
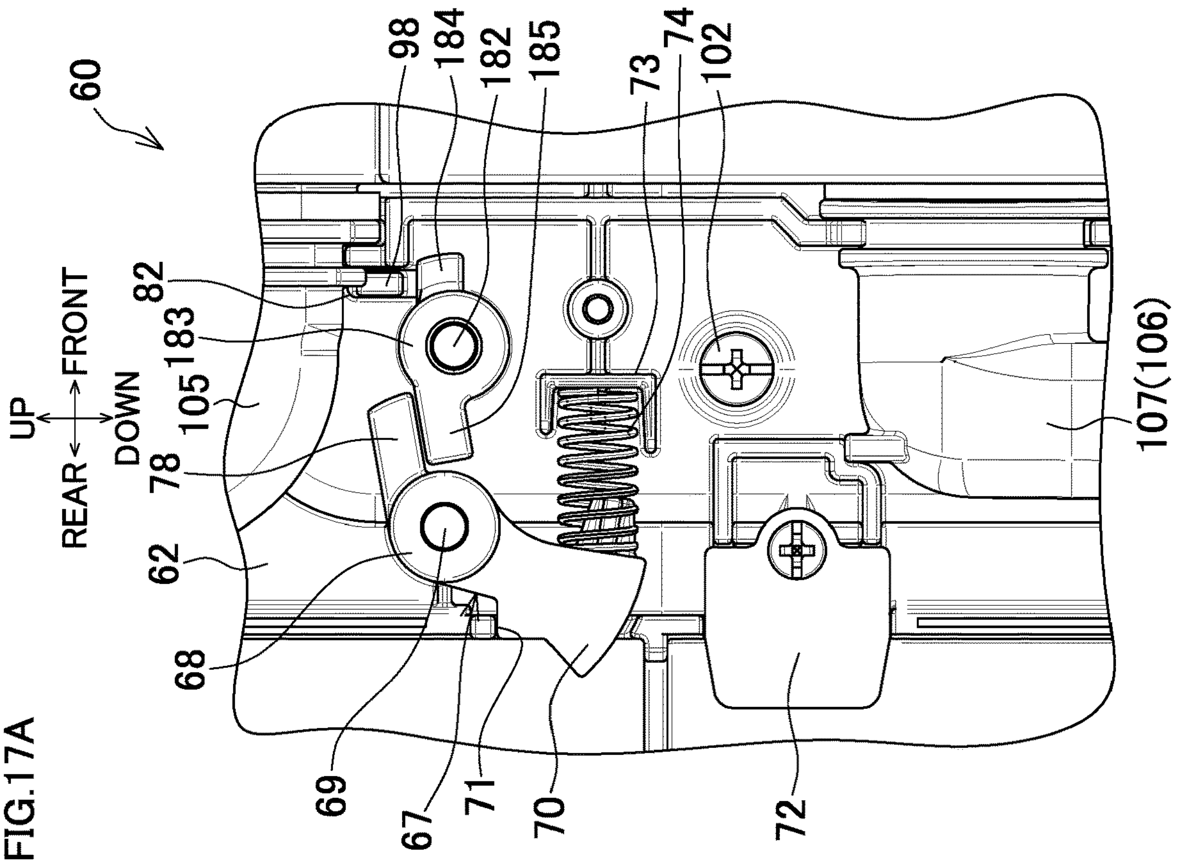

As indicated in FIG. 17A, inside the main body portion 62, the joining member is not disposed in the shaft 69 supporting the stopper 67, the linking piece 78 is integrally disposed to protrude slightly upward in the front side on the cylindrical portion 68 of the stopper 67. Inside the main body portion 62, a second shaft 182 is supported in the right-left direction. The second shaft 182 is supported in parallel with the shaft 69 on the front side of the shaft 69. An intermediate member 183 is disposed to the second shaft 182. The intermediate member 183 is a cylindrical body that is penetrated by the second shaft 182 to be rotatable. On a front side of the intermediate member 183, a first arm portion 184 projecting forward is disposed. On a rear side of the intermediate member 183, a second arm portion 185 projecting rearward is disposed. The second arm portion 185 is positioned on a lower side of the linking piece 78 at a position where it interferes with the linking piece 78 in a rotation direction.

The slit 82 disposed in the mounting recessed portion 80 is disposed close to the front side. The locking piece 98 disposed in the slide bar 88 is also disposed close to the front side and projects into the main body portion 62 from an upper portion of the slit 82. The first arm portion 184 is positioned on a lower side of the locking piece 98 in the ordinary state.

In the above state, the operation button 87 is slid downward up to the lower limit position where it abuts on the stop portion 103 against the biasing of the coil spring 89. Then, the slide bar 88 is slid downward together with the operation button 87. Accordingly, as indicated in FIG. 17B, since the locking piece 98 moves downward to press down the first arm portion 184, the intermediate member 183 rotates right. Then, since the second arm portion 185 presses up the linking piece 78 on the opposite side, the stopper 67 is rotated left to the locking release position. When the downward operation of the operation button 87 is released, the operation button 87 moves to the upper limit position together with the slide bar 88 by the biasing of the coil spring 89. The stopper 67 also returns to the locking position by the biasing of the coil spring 74.

In the dust collection system S according to the modification example, when the dust collecting attachment 60 is removed, after the operation button 87 is slid downward, the casing 61 is slid downward. Accordingly, the operation directions are the identical up-down direction with one another, and thus, workability on removal of the dust collecting attachment 60 is improved.

In particular, the locking by the stopper 67 can be released by a downward operation of the operation button 87.

Accordingly, the operation direction of the operation button 87 and the removal direction of the dust collecting attachment 60 match, resulting in simpler removal operation.

The following describes the modification examples common to each disclosure.

In the above-described electric power tool, while the dust suction bit is used as the tool bit, the tool bit does not have to be a dust suction bit. In this case, another cylindrical attachment that covers an outside of a tool bit may be mounted to a distal end of an electric power tool, and a hose mounting portion disposed in the attachment and a suctioning portion of a dust collecting attachment may be connected with a flexible hose.

In the dust collecting attachment, the connection portion of the flexible hose may be on other positions such as an upper surface or a side surface, not on a front surface of a casing.

However, the dust collecting attachment does not have to use a flexible hose. For example, the dust collecting attachment may internally include a dust collecting route to have a cylindrical sliding portion projecting from a casing and a suction opening through which a tool bit penetrates at a distal end of the sliding portion.

In the dust collecting attachment, the position and the structure of the dust box are not limited to the above-described example. The dust collecting portion is not limited to the above-described dust box, and a cyclone structure having no filter may be employed. Accordingly, the dust collecting route can be changed, as necessary.

The electric power tool does not have to be an AC machine like the hammer drill of the above-described example, and a DC machine having a battery as a power source may be employed.

The electric power tool is not limited to a hammer drill, and other electric power tools such as an electric hammer may be employed.

From the above-described content, the following disclosures according to a dust collection system for an electric power tool are also extracted.

(1) A dust collection system for an electric power tool includes an electric power tool and a dust collecting attachment. The dust collecting attachment is mounted to the electric power tool for collecting dust generated during using the electric power tool. The dust collecting attachment includes a suctioning portion and a dust collecting portion capturing dust suctioned from the suctioning portion. The dust collecting attachment is attachable to and removable from the electric power tool by relative movement to a predetermined direction relative to the electric power tool. The dust collecting attachment further includes a locking member and an operation member. The locking member locks with the electric power tool to suppress drop-off from the electric power tool in a mounted state to the electric power tool. The operation member is configured to release the locking by the locking member by a release operation in a predetermined direction. The predetermined direction where the dust collecting attachment is attached to and removed from the electric power tool and the predetermined direction where the release operation of the operation member is performed are both an up-down direction.

(2) The dust collection system for the electric power tool according to (1), wherein an intermediate member moving the locking member to a locking release position in conjunction with the release operation of the operation member is disposed between the locking member and the operation member.

(3) The dust collection system for the electric power tool according to (1) or (2), wherein the locking member rotates in a front-rear direction to engage with and disengage from the electric power tool.

(4) The dust collection system for the electric power tool according to any of (1) to (3), wherein guiding portions that guide relative movement of the dust collecting attachment by engaging with one another in the up-down direction in attachment and removal of the dust collecting attachment are each disposed in three places of both right and left sides and at a center in a right-left direction in the electric power tool and the dust collecting attachment.

(5) The dust collection system for the electric power tool according to (4), wherein the center guiding portion is disposed immediately below the locking member.

(6) The dust collection system for the electric power tool according to any of (1) to (5), wherein the operation member is configured to release the locking by the locking member by an upward operation.

(7) The dust collection system for the electric power tool according to any of (1) to (5), wherein the operation member is configured to release the locking by the locking member by a downward operation.

(8) The dust collection system for the electric power tool according to any of (1) to (7), wherein a hose mounting portion communicated with a suction opening for dust is disposed to a tool bit mounted to the electric power tool, and a flexible hose is connected between the suctioning portion of the dust collecting attachment and the hose mounting portion.

(9) The dust collection system for the electric power tool according to any of (1) to (8), wherein the operation member is disposed on any one of left side surface and right side surface of the dust collecting attachment, and a finger hook portion is disposed on the other side surface of the dust collecting attachment.

(10) The dust collection system for the electric power tool according to any of (1) to (9), wherein the dust collecting attachment has a dust collecting fan, and a fan shaft of the dust collecting fan is connected to a rotation shaft that rotates in accordance with driving of motor disposed in the electric power tool to allow the dust collecting fan to rotate integrally with the rotation shaft in the mounted state to the electric power tool.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

The invention claimed is:

1. A dust collecting attachment for an electric power tool, the dust collecting attachment comprising:

dust collecting fans;

a suctioning portion that generates a suctioning force by rotation of the dust collecting fans; and a dust collecting portion that captures dust suctioned from the suctioning portion, wherein:

when the dust collecting attachment is mounted to the electric power tool including a motor, a fan shaft of the dust collecting fans is connected to a rotation shaft that is disposed in the electric power tool and rotates in accordance with driving of the motor to allow the dust collecting fans to rotate integrally with the rotation shaft, the dust collecting fans are disposed in a plurality of stages in an axial direction of the fan shaft, the fan shaft includes an outer sleeve to which each of the dust collection fans is fixed, an inner shaft provided within the outer sleeve, and a connecting shaft connected to the rotation shaft and separated from the inner shaft in the axial direction, the inner shaft and the connecting shaft are rotatable relative to each other by a predetermined angle, the inner shaft is connected to the outer sleeve so as to be rotatable together, and the connecting shaft is movable in the axial direction and is biased toward a connection side with the rotation shaft by an elastic member interposed between the connecting shaft and the inner shaft within the outer sleeve, and a protruding position of the connecting shaft toward the connection side is restricted by the outer sleeve.

2. The dust collecting attachment according to claim 1, wherein the elastic member is a coil spring.

3. The dust collecting attachment according to claim 1, wherein the respective dust collecting fans have an identical shape.

4. The dust collecting attachment according to claim 1, wherein the dust collecting fans are disposed in only two stages in the axial direction.

5. The dust collecting attachment according to claim 1, further comprising an engaging portion that engages with the electric power tool to center the fan shaft with respect to the rotation shaft when the fan shaft is connected to the rotation shaft.

6. The dust collecting attachment according to claim 5, wherein a bearing holding member comprises the engaging portion, the bearing holding member holding a bearing supporting the fan shaft, and the fan shaft and the bearing holding member are positioned to one another via the bearing.

7. The dust collecting attachment according to claim 6, wherein the bearing holding member has a sleeve shape in which a ring-shaped end portion serving as the engaging portion projects on a side of the rotation shaft.

8. The dust collecting attachment according to claim 1, further comprising a first flow regulating member between the dust collecting fans, the first flow regulating member guiding air from an outer peripheral side of the dust collecting fan of a first stage to a center side of the dust collecting fan of a second stage, wherein each of the dust collecting fans is a centrifugal fan.

9. The dust collecting attachment according to claim 8, further comprising a second flow regulating member between the dust collecting fan of the first stage and the first flow regulating member, the second flow regulating member partitioning between a downstream side surface of the dust collecting fan of the first stage and an airflow by the first flow regulating member.

10. The dust collecting attachment according to claim 9, further comprising a whirl-shaped rib disposed upright on a surface of the second flow regulating member on a side of the first flow regulating member.

11. The dust collecting attachment according to claim 9, further comprising a plurality of whirl-shaped vanes disposed on a surface on an upstream side of the airflow in each of the dust collecting fans, wherein a rib of the second flow regulating member is formed in a winding direction identical to a direction of the vanes.

12. The dust collecting attachment according to claim 9, wherein the first flow regulating member and the second flow regulating member are secured with one another.

13. The dust collecting attachment according to claim 12, wherein the first flow regulating member is a box-shaped body having a circular shape that surrounds the dust collecting fan of the first stage from the axial direction and an outside in a radial direction, and the second flow regulating member is secured inside the first flow regulating member.

14. The dust collecting attachment according to claim 13, wherein the first flow regulating member is constituted by assembling a pair of half-divided members divided in two having a diameter direction as a dividing surface, and in association with assembling of the pair of half-divided members, the dust collecting fan of the first stage is covered, and the second flow regulating member is secured.

15. An electric power tool comprising the dust collecting attachment according to claim 1.

16. A dust collecting attachment for an electric power tool, the dust collecting attachment comprising:

dust collecting fans;

a suctioning portion that generates a suctioning force by rotation of the dust collecting fans;

a dust collecting portion that captures dust suctioned from the suctioning portion, wherein:

when the dust collecting attachment is mounted to the electric power tool including a motor, a fan shaft of the dust collecting fans is connected to a rotation shaft that is disposed in the electric power tool and rotates in accordance with driving of the motor to allow the dust collecting fans to rotate integrally with the rotation shaft, and the dust collecting fans are disposed in a plurality of stages in an axial direction of the fan shaft; and an engaging portion that engages with the electric power tool to center the fan shaft with respect to the rotation shaft when the fan shaft is connected to the rotation shaft, wherein:

a bearing holding member comprises the engaging portion, the bearing holding member holding a bearing supporting the fan shaft, the fan shaft and the bearing holding member are positioned to one another via the bearing, and the bearing holding member has a sleeve shape in which a ring-shaped end portion serving as the engaging portion projects on a side of the rotation shaft.

* * * * *